US011735972B2

(12) United States Patent
Bailey et al.

(10) Patent No.: US 11,735,972 B2
(45) Date of Patent: Aug. 22, 2023

(54) OVERLAPPED END CAPS FOR STATOR CORE

(71) Applicant: Nidec Motor Corporation, St. Louis, MO (US)

(72) Inventors: Daniel E. Bailey, Ballwin, MO (US); Chetan O. Modi, Valley Park, MO (US); Paul G. Michaels, St. Louis, MO (US); Jahir Flores, San Nicolas de los Garza (MX); Ryan M. Bastien, St. Charles, MO (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

(21) Appl. No.: 18/148,611

(22) Filed: Dec. 30, 2022

(65) Prior Publication Data
US 2023/0136725 A1    May 4, 2023

Related U.S. Application Data

(62) Division of application No. 16/862,641, filed on Apr. 30, 2020, now Pat. No. 11,616,411.

(60) Provisional application No. 62/948,683, filed on Dec. 16, 2019.

(51) Int. Cl.
| | |
|---|---|
| *H02K 3/48* | (2006.01) |
| *H02K 3/12* | (2006.01) |
| *H02K 1/16* | (2006.01) |
| *H02K 3/34* | (2006.01) |
| *H02K 3/487* | (2006.01) |
| *H02K 5/15* | (2006.01) |
| *H02K 5/02* | (2006.01) |
| *H02K 5/04* | (2006.01) |

(52) U.S. Cl.
CPC ............. *H02K 3/48* (2013.01); *H02K 1/165* (2013.01); *H02K 3/12* (2013.01); *H02K 3/345* (2013.01); *H02K 3/487* (2013.01); *H02K 5/02* (2013.01); *H02K 5/04* (2013.01); *H02K 5/15* (2013.01)

(58) Field of Classification Search
CPC ............ H02K 1/06; H02K 1/16; H02K 1/165; H02K 3/12; H02K 3/30; H02K 3/48; H02K 3/487; H02K 5/00; H02K 5/02; H02K 5/04; H02K 5/08; H02K 5/15; H02K 11/014
USPC .......... 310/89, 216.001, 0.105, 0.115, 0.118, 310/0.134, 0.136, 0.137
See application file for complete search history.

(56) References Cited

U.S. PATENT DOCUMENTS

| | | | | |
|---|---|---|---|---|
| 7,166,949 | B2 * | 1/2007 | Okada | H02K 3/522 |
| | | | | 310/194 |
| 8,400,041 | B2 * | 3/2013 | Modi | H02K 3/522 |
| | | | | 310/194 |
| 9,088,191 | B2 * | 7/2015 | Yokogawa | H02K 3/345 |
| 9,154,010 | B2 * | 10/2015 | Yokogawa | H02K 3/522 |
| 2004/0245882 | A1 * | 12/2004 | Horie | H02K 3/522 |
| | | | | 310/194 |

(Continued)

*Primary Examiner* — Rashad H Johnson
(74) *Attorney, Agent, or Firm* — Hovey Williams LLP

(57) ABSTRACT

A set of interchangeably pairable end caps is provided for electrically insulating a variety of stator cores having differing axial stack heights. Each pair of end caps cooperatively defines a generally radially projecting, generally axially extending wire barrier including axially opposed ends. Each of the ends forms a respective rounded winding ramp configured to smoothly guide wiring into a wire trough in part defined by the wire barrier.

9 Claims, 18 Drawing Sheets

(56) References Cited

U.S. PATENT DOCUMENTS

| | | | | |
|---|---|---|---|---|
| 2009/0127969 A1* | 5/2009 | Okuyama | ............... | H02K 3/522 |
| | | | | 310/215 |
| 2010/0181863 A1* | 7/2010 | Murakami | ............. | H02K 3/522 |
| | | | | 310/215 |
| 2012/0267979 A1* | 10/2012 | Yoshida | ................. | H02K 3/522 |
| | | | | 310/214 |
| 2013/0193800 A1* | 8/2013 | Yokogawa | ............. | H02K 3/522 |
| | | | | 310/215 |
| 2013/0221770 A1* | 8/2013 | Yokogawa | ............. | H02K 3/345 |
| | | | | 310/43 |
| 2014/0292124 A1* | 10/2014 | Nakamura | ............. | H02K 3/522 |
| | | | | 310/71 |
| 2016/0308416 A1* | 10/2016 | Azusawa | ................ | H02K 3/345 |
| 2017/0163118 A1* | 6/2017 | Kimpara | .............. | H02K 1/2706 |
| 2017/0222511 A1* | 8/2017 | Wang | ...................... | H02K 3/325 |
| 2017/0244299 A1* | 8/2017 | Poon | ...................... | H02K 5/225 |
| 2017/0264148 A1* | 9/2017 | Kreidler | ................. | H02K 3/522 |
| 2018/0123416 A1* | 5/2018 | Yamasaki | ........... | H02K 15/0062 |
| 2018/0156638 A1* | 6/2018 | Liu | ....................... | G01D 5/2046 |
| 2019/0074735 A1* | 3/2019 | Shono | .................... | H02K 1/165 |

\* cited by examiner

OVERLAPPED END CAPS FOR STATOR CORE

CROSS-REFERENCE TO RELATED APPLICATIONS

This application is a divisional application of U.S. patent application Ser. No. 16/862,641, filed Apr. 30, 2020, which claims benefit of U.S. Provisional Patent Application No. 62/948,683, filed Dec. 16, 2019, and entitled OVERLAPPED END CAPS FOR STATOR CORE, the entire disclosure of each of which is hereby incorporated by reference herein.

BACKGROUND OF THE INVENTION

1. Field of the Invention

The present invention relates generally to a stator for use in an electric motor. More particularly, the present invention concerns electrical insulation for a stator core for use in the stator of an electric motor.

2. Discussion of the Prior Art

Electric motors often include a stator core and insulation associated with the stator core. For instance, electrically insulative end caps may be provided to overlie portions of the teeth of the stator core. Liners, such as those formed of Mylar, are often used to insulate portions of the teeth that are not fully insulated by the end caps.

Winding of stator cores often provides numerous challenges. Due to the presence of numerous structures in the vicinity of winding slots, for instance, catching of wires during the winding process may occur, leading to poor coil consistency, wire damage, and/or lost time due to the need for corrective efforts.

SUMMARY

According to one aspect of the present invention, a set of interchangeably configurable end caps is provided for electrically insulating a variety of stator cores. The stator cores include at least a first stator core presenting a first axial stack height and a second stator core presenting a second axial stack height that is different than the first axial stack height. The set of end caps comprises a first first-type end cap including an axially extending first first-type skirt having an axial first first-type skirt length, a first second-type end cap including an axially extending first second-type skirt having an axial first second-type skirt length, and a second second-type end cap including an axially extending second second-type skirt having an axial second second-type skirt length that is different than the first second-type skirt length. The first and second second-type end caps are interchangeably pairable with the first first-type end cap, with the first and second second-type skirts configured to extend toward the first first-type skirt, such that a first cumulative axial extent as cooperatively presented by the paired first first-type skirt and first second-type skirt is different than a second cumulative axial extent as cooperatively presented by the paired first first-type skirt and second second-type skirt. The first cumulative axial extent corresponds to the first axial stack height and the second cumulative axial extent corresponds to the second axial stack height.

According to another aspect of the present invention a stator is provided. The stator comprises a generally toroidal core presenting axially opposed first and second core faces, a first end cap fitted to the core, a second end cap fitted to the core, and wiring wound about the core. The end caps extend toward each other and between the upper and lower core faces to at least in part encompass the core. The end caps are at least in part disposed between the wiring and the core. The end caps cooperatively define an axially extending trough receiving at least a portion of the wiring. The end caps cooperatively define a generally radially projecting, generally axially extending wire barrier defining a generally circumferential margin of the trough. The wire barrier includes axially opposed ends, wherein the first end cap defines a first one of the ends and the second end cap defines a second one of the ends. Each of the ends forms a respective rounded winding ramp configured to smoothly guide wiring into the trough during wiring of the core.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein.

Figure 1:
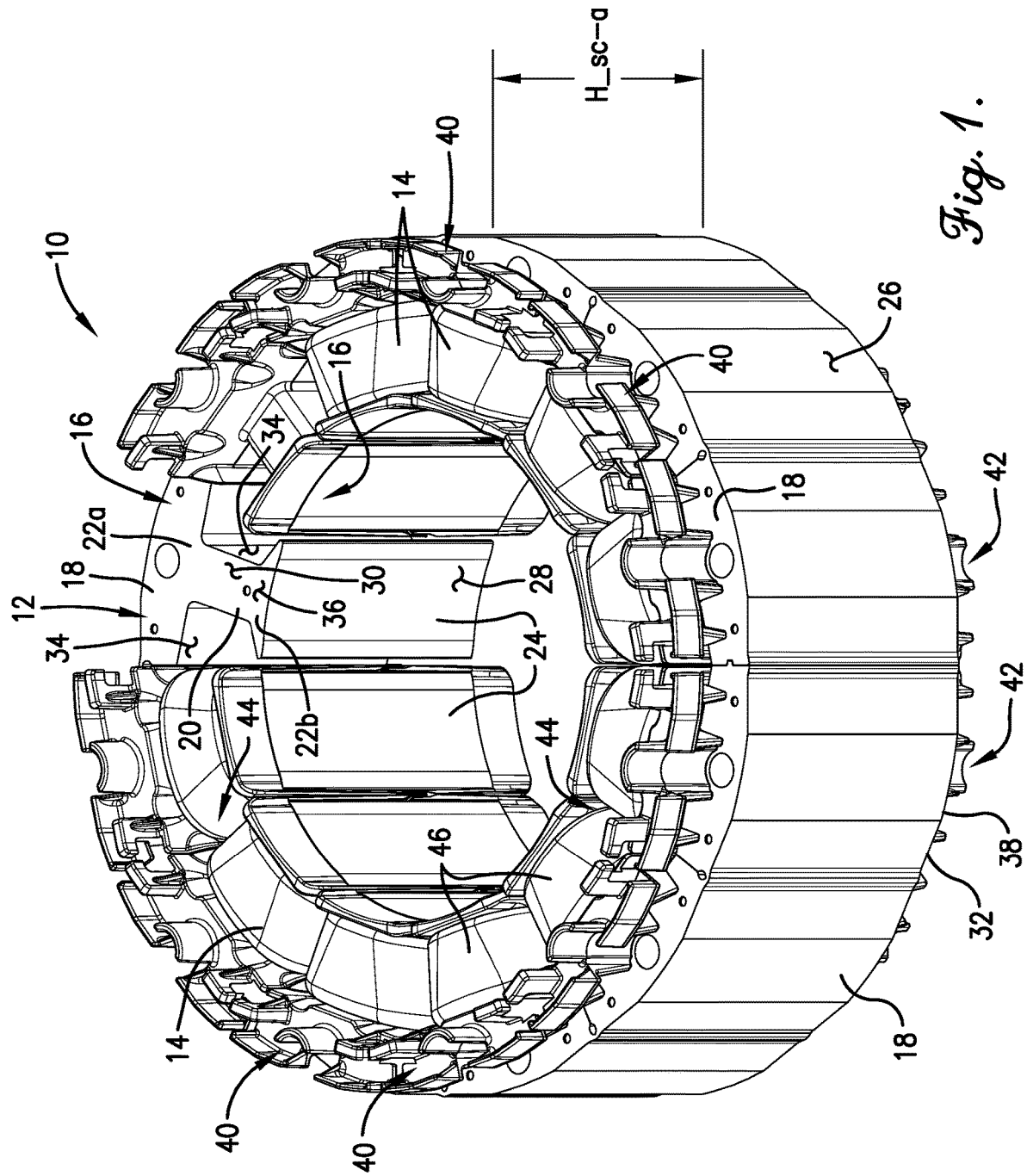
FIG. 1 is a top perspective view of a fully assembled stator according to a preferred embodiment of the present invention, with a coil and a pair of end caps removed from one of the stator teeth.

The drawing figures do not limit the present invention to the specific embodiments disclosed and described herein. While the drawings do not necessarily provide exact dimensions or tolerances for the illustrated structures or components, the drawings are to scale with respect to the relationships between the components of the structures illustrated in the drawings.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Furthermore, unless specified or made clear, the directional references made herein with regard to the present invention and/or associated components (e.g., top, bottom, upper, lower, inner, outer, etc.) are used solely for the sake of convenience and should be understood only in relation to each other. For instance, a component might in practice be oriented such that faces referred to as "top" and "bottom" are sideways, angled, inverted, etc. relative to the chosen frame of reference.

Motor Overview

In a preferred embodiment of the present invention, a motor is provided. The motor preferably includes a stator 10 and a rotor (not shown) rotatable about an axis. The motor further preferably includes a housing (not shown) defining a motor chamber (not shown). The stator 10 and the rotor are at least substantially received in the motor chamber.

Figure 2:
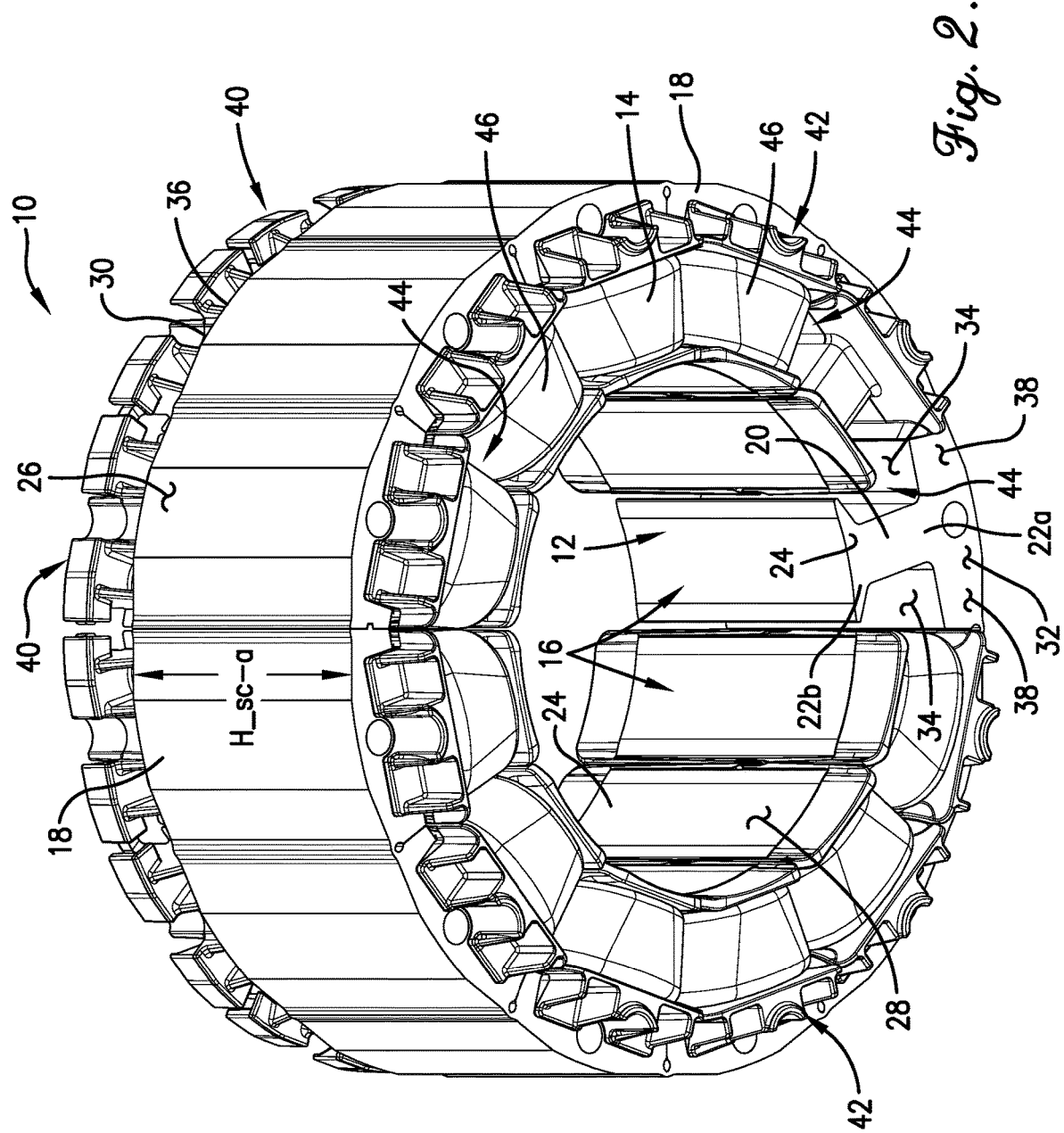
FIG. 2 is a bottom perspective view of the stator of FIG. 1.

In an assembled form (see FIGS. 1 and 2), the stator 10 preferably includes a generally toroidal stator core 12 and a plurality of coils 14 wound about the stator core 12. The stator core 12 is preferably a laminated stator core, although it is permissible for the stator core to be non-laminated. The stator core 12 preferably comprises a ferromagnetic material such as steel, although use of any one or more electrically conductive materials is permissible without departing from the scope of the present invention.

In the assembled form, the stator core 12 preferably includes a plurality of arcuately spaced apart teeth 16. In a preferred embodiment, each of the teeth 16 includes a generally circumferentially extending yoke 18, a generally radial arm 20 extending from the yoke 18 and having an outer end 22a adjacent the yoke 18, and a crown 24 extending generally circumferentially from an inner end 22b of the arm 22.

The stator 10 preferably at least substantially circumscribes the rotor, such that the motor is an inner rotor motor. Certain aspects of the present invention are applicable to dual rotor or outer rotor motors, however.

Each yoke 18 preferably engages a pair of adjacent yokes 18, such that the yokes 18 cooperatively present an outer circumferential stator core face 26. The crowns 24 cooperatively present a discontinuous inner circumferential stator core face 28 configured to face the rotor.

Each tooth 16 preferably presents an upper tooth face 30, a lower tooth face 32, and two side tooth faces 34. The upper tooth faces 30 each preferably include a crown portion 30a, an arm portion 30b, and a yoke portion 30c. The lower tooth faces 32 each preferably include a crown portion 32a, an arm portion 32b, and a yoke portion 32c. The side tooth faces 34 each preferably include a crown portion 34a, an arm portion 34b, and a yoke portion 34c.

The teeth 16 (or, more particularly, the upper tooth faces 30) preferably cooperatively present an upper stator core face 36. Similarly, the teeth 16 (or, more particularly, the lower tooth faces 32) preferably cooperatively present a lower stator core face 38.

It is permissible according to some aspects of the present invention for the stator core to be alternatively configured, however. Among other things, for instance, the stator core could comprise a plurality of interconnected multi-tooth segments, comprise one or more helically wound laminations, or comprise stacked annular laminations each formed from a single punched strip.

As will be discussed in greater detail below, the stator core 12 is preferably electrically insulated by means of upper and lower (or, alternatively described, lead end and opposite lead end, or first-type and second-type) electrically insulative end caps 40 and 42, respectively. As will be apparent from the detailed discussions below, the end caps 40 and 42 preferably provide all necessary insulation for the stator core 12. That is, it is preferable that no other insulation is provided to the core 12 beyond the end caps 40 and 42. For instance, the stator 10 is preferably devoid of insulative inserts or liners (such as those comprising Mylar or paper), powder coating, and/or additional insulative overlayments including but not limited to overmolding.

The coils 14 are preferably wound about the arms 20 of the teeth 16. More particularly, a slot 44 is defined between each adjacent pair of teeth 16. In greater detail, the slot 44 is preferably defined between each adjacent pair of teeth 16 by the proximate side faces 34 (including respective crown, arm, and yoke portions 34a, 34b, and 34c thereof) of the teeth 16. The coils 14 are preferably wound about the teeth 16 and through the slots 44 (on the outside of the end caps 40 and 42, as will be discussed in greater detail below) so as to circumscribe or loop about respective ones of the arms 20. The end caps 40 and 42 are thus disposed between the core 12 and the coils 14.

The coils 14 preferably comprise electrically conductive wiring or wires 46. The wiring 46 is preferably wound multiple times about each tooth 16 to form a plurality of turns or loops. In greater detail, the coils 14 preferably loop around and circumscribe the upper tooth face 30, the lower tooth face 32, and the two side tooth faces 34 of each tooth 16. More particularly, the coils 14 loop around the arm portions 30b, 32b, and 34c of the respective upper, lower, and side tooth faces 30, 32, and 34 of each tooth 16.

The wiring 46 is preferably formed of copper or aluminum, although any one or more of a variety of electrically conductive materials or a combination thereof may be used within the ambit of the present invention. Furthermore, the wiring 46 may be coated or uncoated.

As is customary, the wiring 46 is wound around the teeth 16 in a particular manner according to the configuration and desired performance characteristics of the motor.

Figure 3:
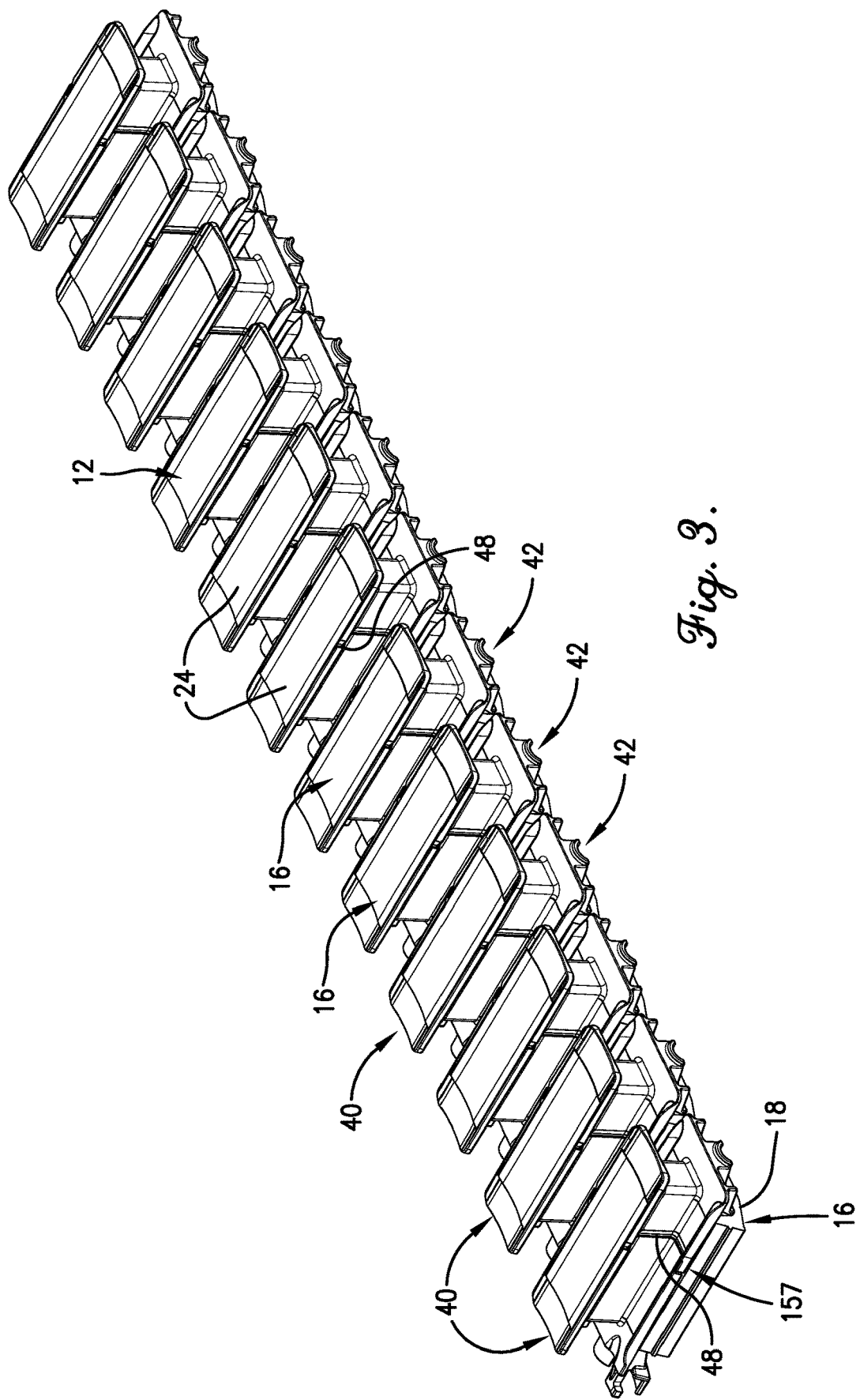
FIG. 3 is a perspective view of the core and end caps of the stator of FIGS. 1 and 2, in a straight configuration and prior to winding.
Figure 4:
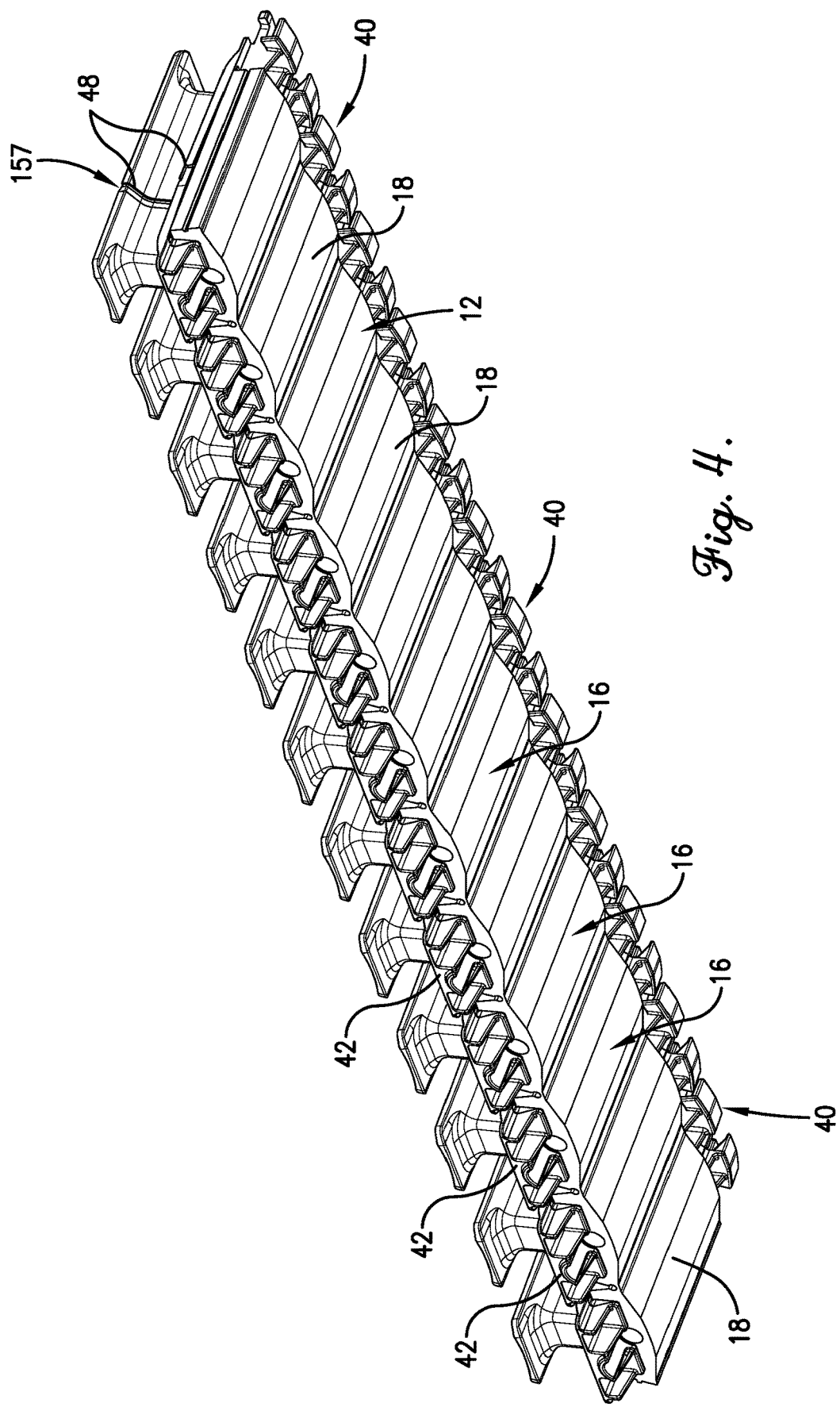
FIG. 4 is a second perspective view of the core and end caps of FIG. 3.
Figure 5:
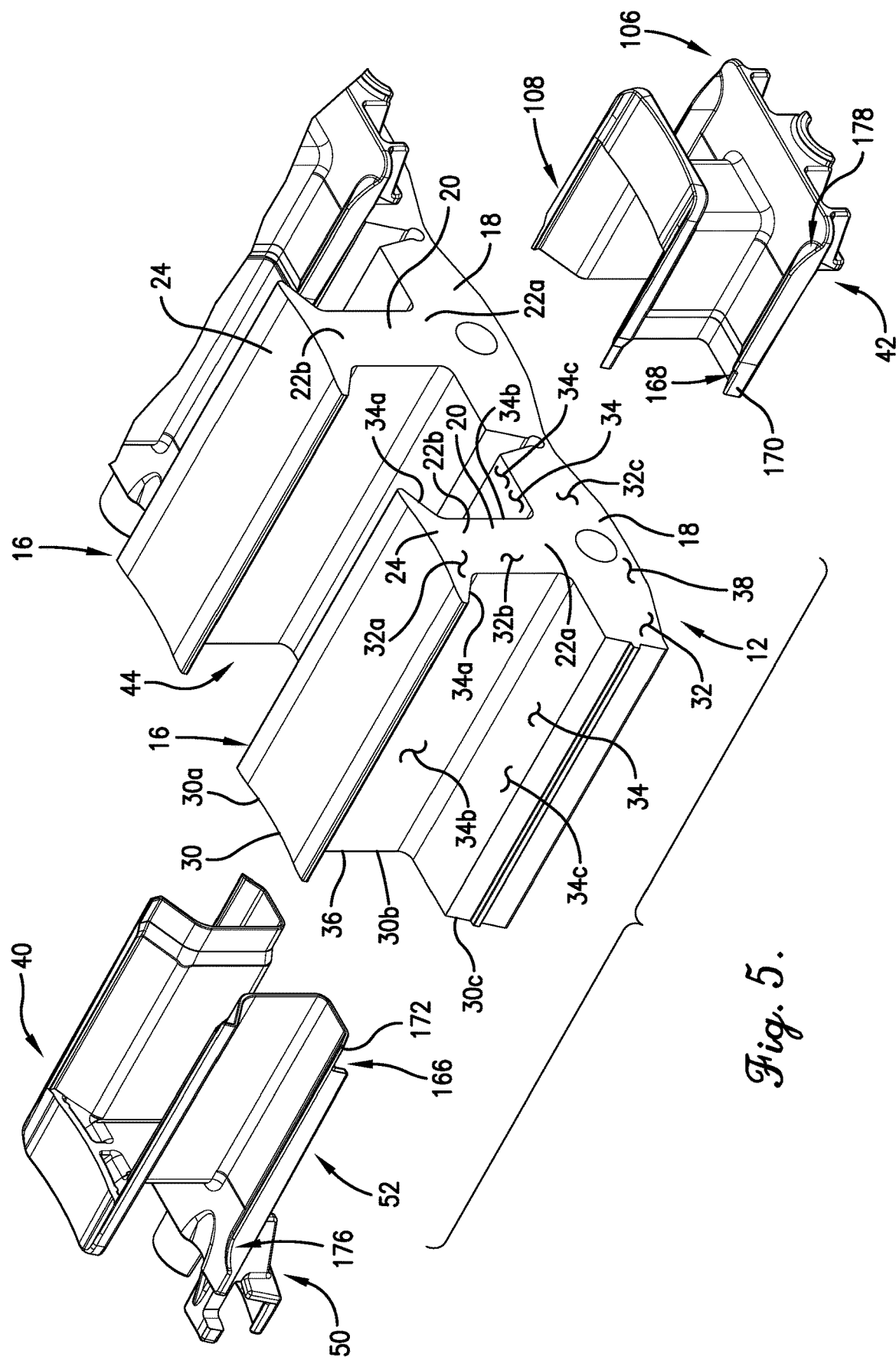
FIG. 5 is an enlarged, exploded perspective view of a portion of the core and end caps as shown in FIG. 3, particularly illustrating the relationship between a single tooth and its associated upper and lower end caps.
Figure 6:
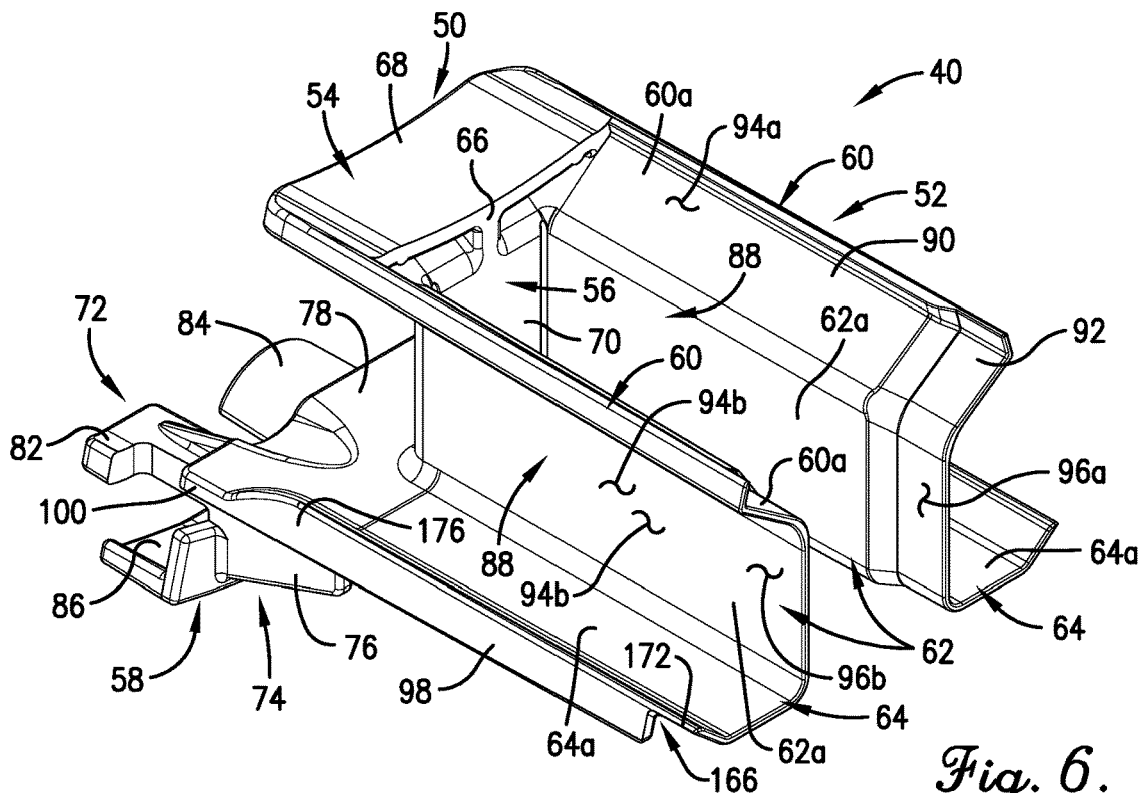
FIG. 6 is an enlarged perspective view of an upper end cap.
Figure 7:
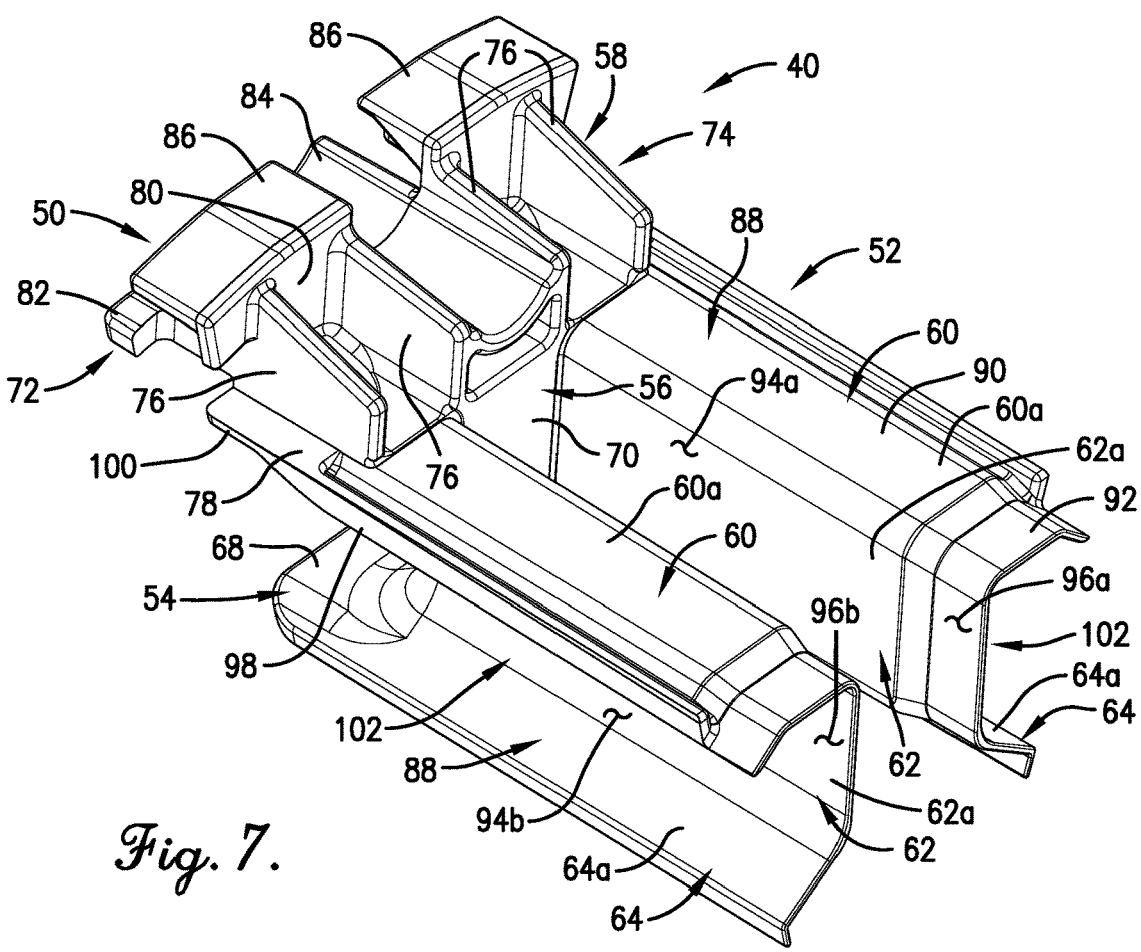
FIG. 7 is an alternative perspective view of the upper end cap of FIG. 6.

The stator core 12 is preferably initially provided in a straight configuration (see FIGS. 3 and 4). That is, the teeth 16 are disposed in a straight line prior to winding. As will be discussed in greater detail below, the end caps 40 and 42 are then slid onto respective ones of the teeth 16. The coils 14 are then preferably wound using a "chain wound" technique. The stator 10 is then curved into its final toroidal form. However, it is noted that alternative winding techniques, including those applied on an already toroidal core, fall within the scope of the present invention.

As noted previously, the stator core 12 is preferably insulated by means of a plurality of end caps 40 and 42 fitted over portions of the teeth 16. Each end cap 40 or 42 preferably comprises an at least substantially electrically insulative material. For instance, a plastic or synthetic resin material may be used. Other materials having suitable electrically insulative properties are permissible, however.

In a preferred embodiment, each end cap 40 and 42 provides both a physical and electrical barrier between the coils 14 and the stator core 12. More particularly, as will be discussed in greater detail below, a pair of upper and lower end caps 40 and 42 are fitted over opposite axial sides (corresponding to upper and lower stator core faces 36 and 38, or alternatively stated, to the upper and lower tooth faces 30 and 32) of a corresponding tooth 16. The end caps 40 and 42 extend axially toward one another and overlap one another at an overlapped region 48 so as to in part encompass the tooth 16 via full (that is, continuous) encirclement of the arm 20. At least partial overlayment of the upper end cap 40 along the crown portion 30a and the yoke portion 30c of the upper tooth face 30, as well as partial overlayment of the lower end cap 42 along the crown portion 32a and the yoke portion 32c of the lower tooth face 32, are also preferably achieved.

Fitting of the end caps 40 and 42 onto the teeth 16 is preferably via a friction fit, although other fit types (e.g., slip) fall within the scope of some aspects of the present invention.

As will be discussed in greater detail below, engagement of each upper end cap 40 with its corresponding lower end cap 42 in the overlapped region 48 is preferably via a slip fit, although it is again permissible according to some aspects of the present invention for other fit types (e.g., friction or tight, permanently secured with adhesive or welding, etc.) to be used.

Upper, Lead End, or First-Type End Caps

Turning now to the general structure of the upper (alternatively, lead end or first-type) end caps 40, each upper end cap 40 includes a top 50 and an axially downwardly extending upper skirt 52. Each top 50 includes a top crown portion 54, a top arm portion 56, and a top yoke portion 58. Each upper skirt 52 includes an upper skirt crown portion 60, an upper skirt arm portion 62, and an upper skirt yoke portion 64.

As will be discussed in greater detail below, the top crown portion 54 corresponds to and is most preferably configured to fully overlie the upper crown portion 30a of the upper face 30 of the corresponding tooth 16. The top arm portion 56 corresponds to and is most preferably configured to fully overlie the upper arm portion 30b of the upper face 30 of the corresponding tooth 16. The top yoke portion 58 corresponds to and is most preferably configured to shield at least part of the upper yoke portion 30c of the upper face 30 of the corresponding tooth 16.

As will also be discussed in greater detail below, each upper skirt 52 preferably extends along both of the tangentially or circumferentially spaced apart side faces 34 of the corresponding tooth 16 so as to fully overlie the upper portions of the crown, arm, and yoke portions 34a, 34b, and 34c, respectively, of the side faces 34.

Each top crown portion 54 preferably includes a generally radially and circumferentially extending crown overlayment 66 and an axially upwardly extending crown retaining wall 68 projecting from the crown overlayment 66 for restricting radially inward movement of the coils 14.

Each top arm portion 56 preferably includes a generally radially and circumferentially extending upper arm overlayment 70.

Each top yoke portion 58 preferably includes an upper wire management structure 72 and a support structure 74. The support structure 74 preferably includes a plurality of brackets 76 that engage the yoke portion 30c of the upper face 30 and extend axially upwardly to a portion of the upper wire management structure 72.

The upper wire management structure 72 of each lead end or upper end cap 40 facilitates routing of wiring 46, including lead ends (not shown) thereof. More particularly, the upper wire management structure 72 preferably includes an axially upwardly and tangentially extending upper retaining wall 78 projecting from an outer end of the corresponding arm overlayment 70, near the end 22a of the corresponding arm 20. The retaining wall 78 is most preferably disposed radially inwardly of the brackets 76. The upper wire management structure 72 additionally includes a floor 80 extending generally orthogonally from the retaining wall 78 and supported by the brackets 76, a pair of hooks 82 extending axially upwardly from tangentially (or circumferentially) opposed ends of the floor 80, and a fastener shield 84 projecting axially upwardly and downwardly from the arcuate center of the floor 80. The downwardly projecting portion of the fastener shield 84 is preferably disposed between a pair of the brackets 76. The upper wire management structure 72 further preferably includes a two-part outer barrier 86 extending generally orthogonally from a radially outer edge of the floor 80.

Figure 20:
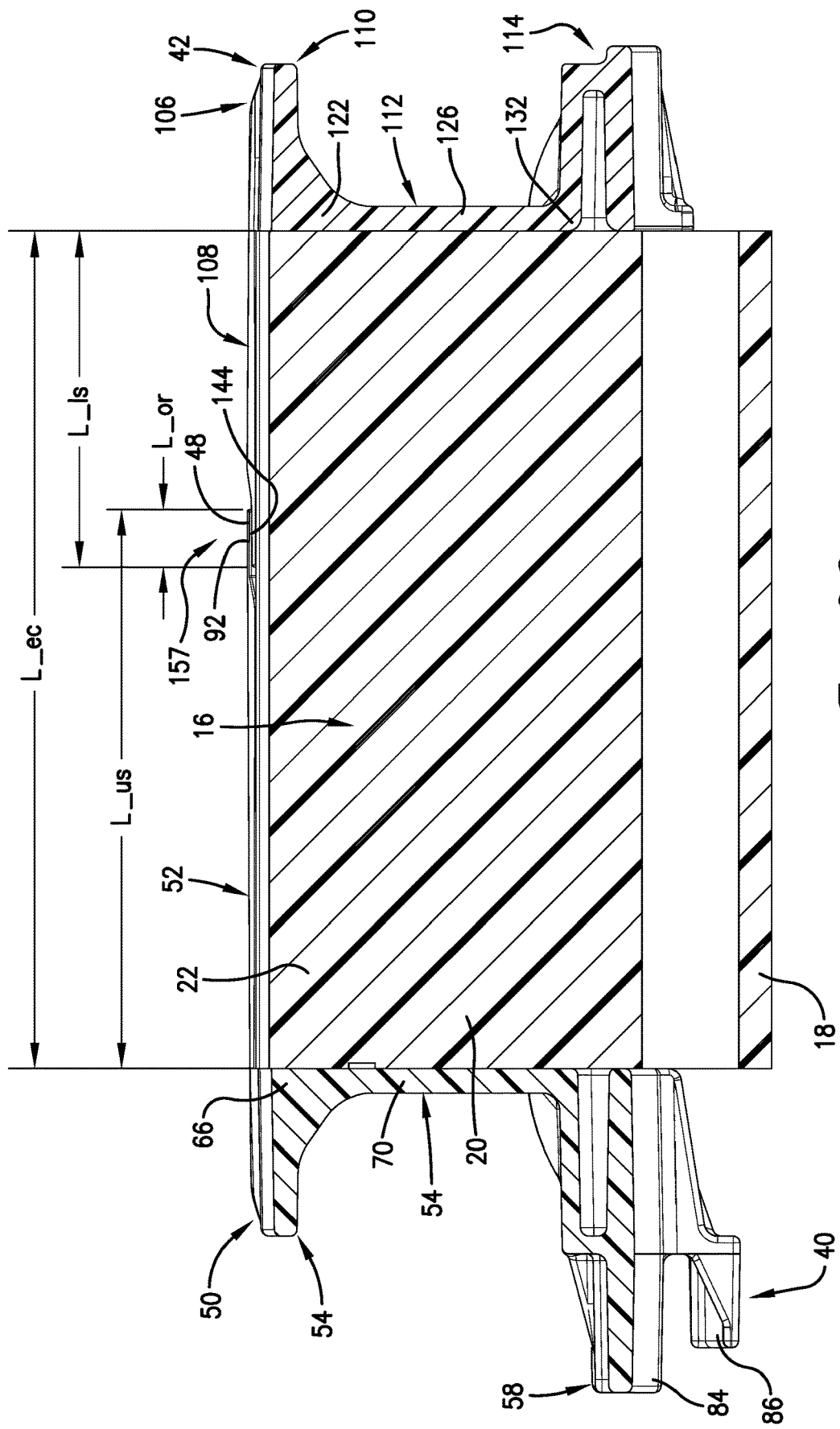
FIG. 20 is a cross-sectional view of a single stator tooth and both upper and lower end caps, taken along line 20-20 of FIG. 19.

Each upper skirt 52 preferably extends axially from the corresponding top 50, toward a corresponding one of the lower end caps 42, so as to present an upper skirt length L_us (see FIG. 20).

Each upper skirt 52 includes a pair of tangentially or circumferentially spaced apart upper skirt sides 88, each of which extends along a respective one of the side faces 34 of the corresponding tooth 16. More particularly, each upper skirt side 88 includes an upper skirt crown portion side 60a, an upper skirt arm portion side 62a, and an upper skirt yoke portion side 64a, each of which extends along and overlies the corresponding crown, arm, and yoke portions 34a, 34b, and 34c of the corresponding side face 34.

Each upper skirt 52 includes an upper main portion 90 and an upper overlappable portion 92 disposed axially below the upper main portion 90. The functionality of the upper overlappable portion 92 will be discussed in greater detail below.

Each upper main portion 90 defines a pair of tangentially or circumferentially innermost upper main portion faces 94a (each associated with a respective one of the upper skirt sides 88) and a pair of tangentially or circumferentially outermost upper main portion faces 94b (also each associated with one of the upper skirt sides 88).

Similarly, each upper overlappable portion 92 defines a pair of tangentially or circumferentially innermost upper overlappable portion faces 96a (each associated with a respective one of the upper skirt sides 88) and a pair of tangentially or circumferentially outermost upper overlappable portion faces 96b (also each associated with one of the upper skirt sides 88).

As will be discussed in greater detail below, the innermost upper overlappable portion faces 96a are preferably disposed tangentially or circumferentially outward of the corresponding innermost upper main portion faces 94a. The corresponding outermost upper overlappable portion faces 96b and outermost upper main portion faces 94b, however, are preferably coplanar with one another.

Each upper skirt 52 also preferably cooperates with the upper wire management structure 72 of the top yoke portion 58 to define a pair of upper wire barrier portions 98. More particularly, the upper retaining wall 78 and the upper skirt yoke portions 64a of each side 88 cooperatively present a pair of tangentially or circumferentially outermost edges 100. Each upper wire barrier portion 98 preferably extends axially along the upper skirt 52 and a portion of the upper retaining wall 78, adjacent the corresponding edge 100, and projects radially inwardly.

Preferably, each set of corresponding upper skirt crown portion sides 60a, upper skirt arm portions sides 62a, upper skirt yoke portion sides 64a, upper retaining walls 78, and upper wire barrier portions 98 cooperatively defines an upper wire trough portion 102 through which wiring 46 is wound and in which a part of the corresponding coil 14 is disposed. (Each slot 44 thus preferably includes a pair of the upper wire trough portions 102.) Each upper wire barrier portion 98 preferably at least in part defines a tangential or circumferential margin of the aforementioned trough portion 102.

The upper wire barrier portions 98 each include an upper end 104. The end 104 is preferably rounded or smoothed in some manner, as opposed to presenting a squared, jagged, or otherwise rough or abruptly edged form. This feature will be discussed in greater detail below.

Lower, Opposite Lead End, or Second-Type End Caps

Turning now to the general structure of the lower (alternatively, opposite lead end or second-type) end caps 42, each lower end cap 42 includes a bottom 106 and an axially upwardly extending lower skirt 108. Each bottom 106 includes a bottom crown portion 110, a bottom arm portion 112, and a bottom yoke portion 114. Each lower skirt 108 includes a lower skirt crown portion 116, a lower skirt arm portion 118, and a lower skirt yoke portion 120.

As will be discussed in greater detail below, the bottom crown portion 110 corresponds to and is most preferably configured to fully overlie the lower crown portion 32a of the lower face 32 of the corresponding tooth 16. The bottom arm portion 112 corresponds to and is most preferably configured to fully overlie the lower arm portion 32b of the lower face 32 of the corresponding tooth 16. The bottom yoke portion 114 corresponds to and is most preferably configured to shield at least part of the lower yoke portion 32c of the lower face 32 of the corresponding tooth 16.

As will also be discussed in greater detail below, each lower skirt 108 preferably extends along both of the tangentially or circumferentially spaced apart side faces 34 of the corresponding tooth 16 so as to fully overlie the lower portions of the crown, arm, and yoke portions 34a, 34b, and 34c, respectively, of the side faces 34.

Each bottom crown portion 110 preferably includes a generally radially and circumferentially extending crown underlayment 122 and an axially downwardly extending retaining wall 124 projecting from the crown underlayment 122 for restricting radially inward movement of the coils 14.

Each bottom arm portion 112 preferably includes a generally radially and circumferentially extending lower arm underlayment 126.

Each bottom yoke portion 114 preferably includes a lower wire management structure 128, a support structure 130, and a yoke underlayment 132. The support structure 130 preferably includes a plurality of brackets 134 that engage the yoke underlayment 132 and extend axially downwardly therefrom, adjacent and radially outside the lower wire management structure 128.

The lower wire management structure 128 of each opposite lead end or lower end cap 42 facilitates routing of wiring 46. More particularly, the lower wire management structure 128 preferably includes an axially downwardly and tangentially extending lower retaining wall 136 projecting from an outer end of the corresponding arm underlayment 126, adjacent the outer end 22a of the arm 20. The retaining wall 136 is most preferably disposed radially inwardly of the brackets 134.

The lower wire management structure 128 additionally includes a fastener shield 138 projecting axially downwardly the arcuate center of the yoke underlayment 132. The fastener shield 138 is preferably disposed between a pair of the brackets 134.

Each lower skirt 108 preferably extends axially upwardly from the corresponding bottom 106, toward a corresponding one of the upper end caps 40, so as to present a lower skirt length L_ls (see FIG. 20).

Each lower skirt 108 includes a pair of tangentially or circumferentially spaced apart lower skirt sides 140, each of which extends along a respective one of the side faces 34 of the corresponding tooth 16. More particularly, each lower skirt side 140 includes a lower skirt crown portion side 116a, a lower skirt arm portion side 118a, and a lower skirt yoke portion side 120a, each of which extends along and overlies the corresponding crown, arm, and yoke portions 34a, 34b, and 34c of the corresponding side face 34.

Each lower skirt 108 includes a lower main portion 142 and a lower overlappable portion 144 disposed axially below the lower main portion 142. The functionality of the lower overlappable portion 144 will be discussed in greater detail below.

Each lower main portion 142 defines a pair of tangentially or circumferentially innermost lower main portion faces 146a (each associated with a respective one of the lower skirt sides 140) and tangentially or circumferentially outermost lower main portion faces 146b (also each associated with one of the lower skirt sides 140).

Similarly, each lower overlappable portion 144 defines a pair of tangentially or circumferentially innermost lower overlappable portion faces 148a (each associated with a respective one of the lower skirt sides 140) and tangentially or circumferentially outermost lower overlappable portion faces 148b (also each associated with one of the lower skirt sides 140).

As will be discussed in greater detail below, the outermost lower overlappable portion faces 148b are preferably disposed tangentially or circumferentially inward of the corresponding outermost lower main portion faces 146b. The corresponding innermost lower overlappable portion faces 148a and innermost lower main portion faces 146a, however, are preferably co-planar with one another.

Each lower skirt 108 also preferably cooperates with the lower wire management structure 128 of the bottom yoke portion 114 to define a pair of lower wire barrier portions 150. More particularly, the lower retaining wall 136 and the lower skirt yoke portions 120a of each side 140 cooperatively present a pair of tangentially or circumferentially outermost edges 152. Each lower wire barrier portion 150 preferably extends axially along the lower skirt 108 and a portion of the lower retaining wall 136, adjacent the corresponding edge 152, and projects radially inwardly.

Preferably, each set of corresponding lower skirt crown portion sides 116a, lower skirt arm portion sides 118a, lower skirt yoke portion sides 120a, lower retaining walls 136, and lower wire barrier portions 150 cooperatively defines a lower wire trough portion 154 through which wiring 46 is wound and in which a part of the corresponding coil 14 is disposed. (Each slot 44 thus preferably includes a pair of the lower wire trough portions 154.) Each lower wire barrier portion 150 preferably at least in part defines a tangential or circumferential margin of the aforementioned trough portion 154.

The lower wire barrier portions 150 each include a lower end 156. The end 156 is preferably rounded or smoothed in some manner, as opposed to presenting a squared, jagged, or otherwise rough or abruptly edged form. This feature will be discussed in greater detail below.

End Cap Overlapping Interengagement

In a preferred embodiment, corresponding ones of the upper and lower end caps 40 and 42 extend toward one another or, alternatively stated, toward the lower and upper stator core faces 38 and 36, respectively. Furthermore, the end caps 40 and 42 preferably engage one another at a juncture 157 such that the arm 20 of the corresponding tooth 16 is fully covered by the end caps 40 and 42 cooperatively. That is, paired end caps 40 and 42 preferably cooperatively extend continuously axially along the core and leave no surface (or, more specifically, in a preferred embodiment, no metal) of the corresponding arm 20 exposed. Stated in yet another way, the paired end caps 40 and 42 cooperatively form an axially continuous arm covering devoid of gaps or openings.

Figure 17:
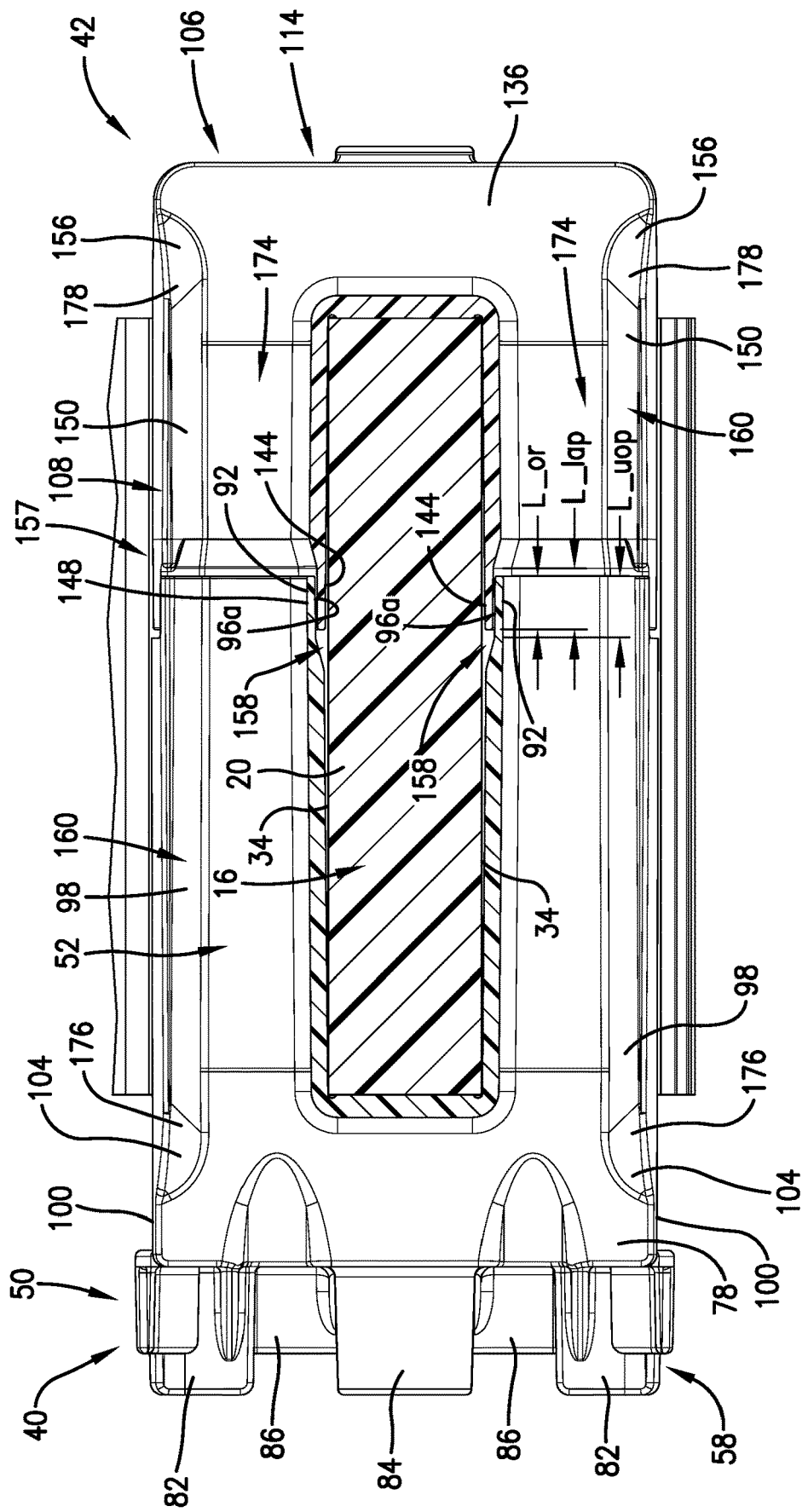
FIG. 17 is a cross-sectional view of the single stator tooth and the engaged pair of upper and lower end caps of FIG. 16, taken along line 17-17 of FIG. 16.
Figure 18:
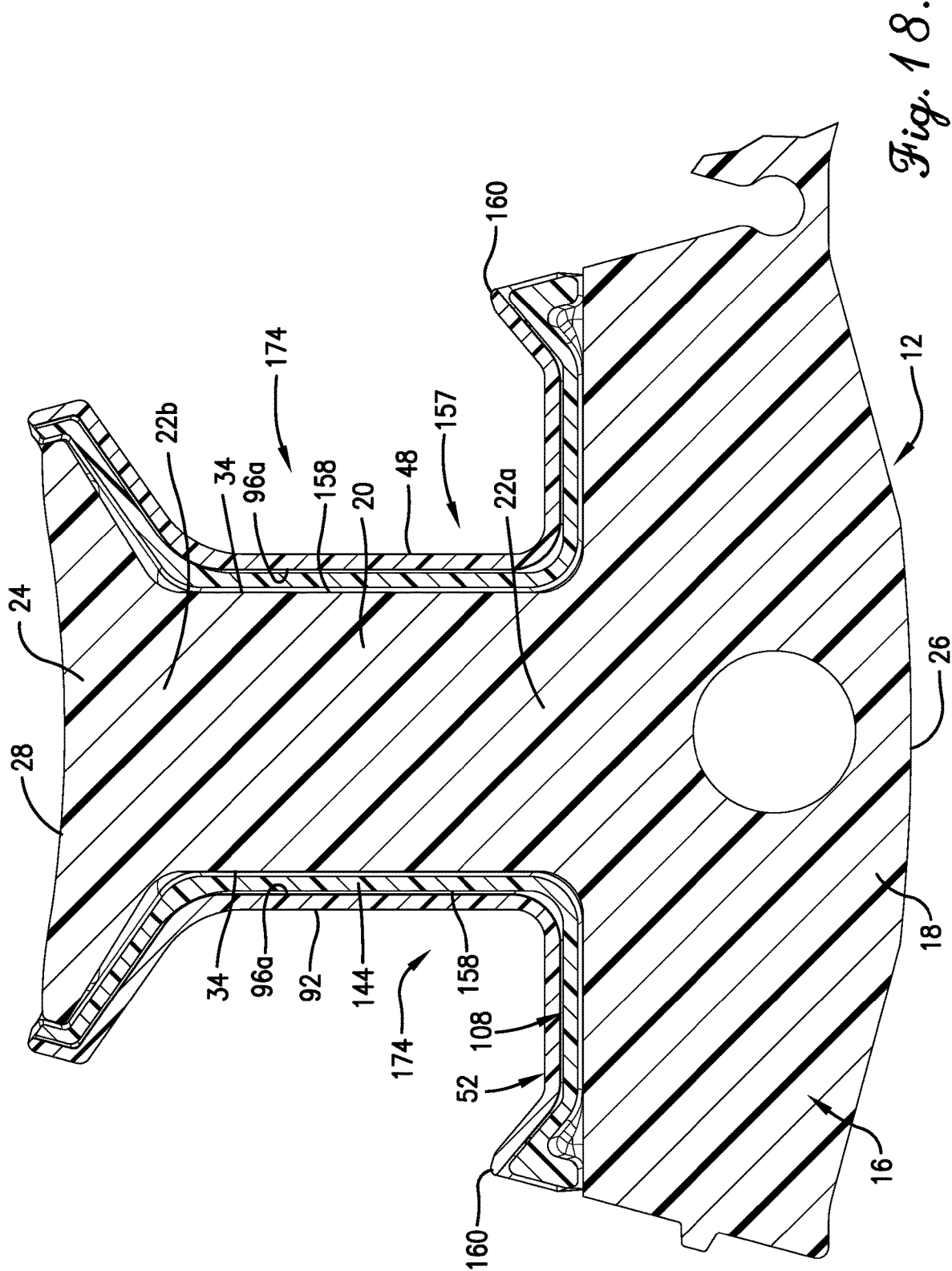
FIG. 18 is an additional cross-sectional view of the single stator tooth and the engaged pair of upper and lower end caps of FIG. 16, taken along line 18-18 of FIG. 16.
Figure 19:
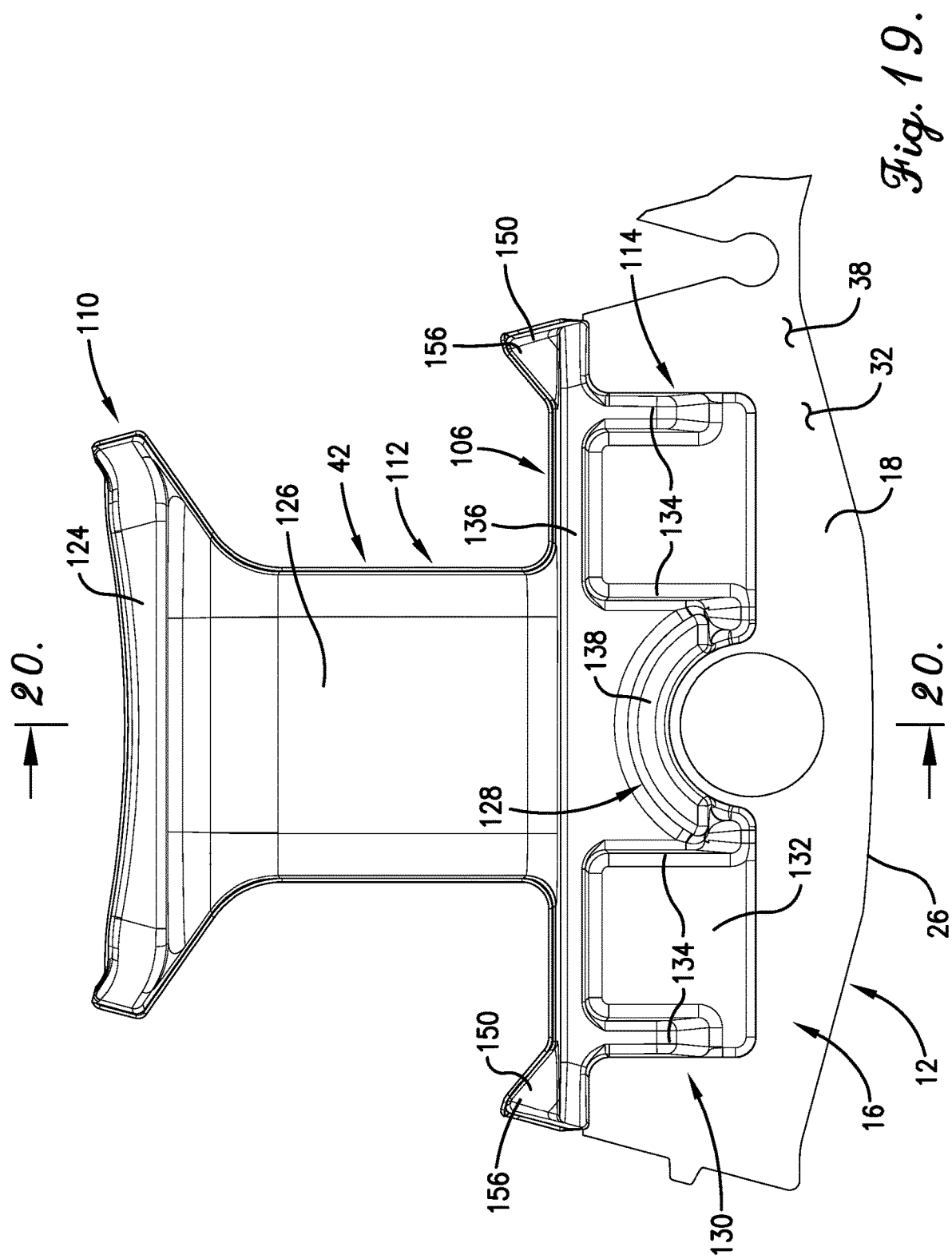
FIG. 19 is a bottom view of a single stator tooth and a lower end cap.

More particularly, for each pair of end caps 40 and 42, the upper overlappable portion 92 of the upper skirt 52 and the lower overlappable portion 144 of the lower skirt 108 at least in part overlap or overlie one another such that the previously mentioned overlapped region 48 is defined at the juncture 157. In the illustrated embodiment, for instance, the upper overlappable portion 92 overlies the lower overlappable portion 144. In greater detail still as best shown in FIGS. 17 and 18, a recess 158 is defined between the side faces 34 of each tooth 16 and the inner tangential faces 96a of the upper overlappable portion 92. The lower overlappable portion 144 is at least in part received in the recess 158.

In some instances, the entireties of either of both of the upper and lower overlappable portions 92 and 144, respectively, may be included in (i.e., define) the overlapped region 48. In other instances, however, only a small portion of either or both of the upper and lower overlappable portions 92 and 144 may be included in (i.e., define) the overlapped region 48.

More particularly, it is noted that, in assembled or paired form as when secured on a tooth 16, a paired set of end caps 40 and 42 cooperatively present an actual cumulative end cap axial extent or length L_ec (see FIG. 20) defined between the crown and arm overlayments 66 and 70, respectively, and the crown, arm, and yoke underlayments 122, 126, and 132, respectively. The stator core 12 presents an actual axial stack height H_sc-a (see FIGS. 1 and 2) defined between the upper and lower core faces 36 and 38. After assembly of the stator 12, the actual cumulative end cap axial extent or length L_ec is most preferably equal to or only slightly larger than the actual axial stack height H_sc-a to facilitate axial coverage of the core 12 as described above.

As is conventional, the stator core 12 is preferably specified with a nominal (i.e., designed, intended, etc.) axial stack height and a tolerance associated therewith. As will be readily understood by those of ordinary skill in the art, the tolerance may be based on, among other things, expected manufacturing capabilities and overall motor precision requirements. The nominal stack height plus or minus to the tolerance provides maximum and minimum allowable stack heights, respectively, associated with the given stator core.

Figure 15:
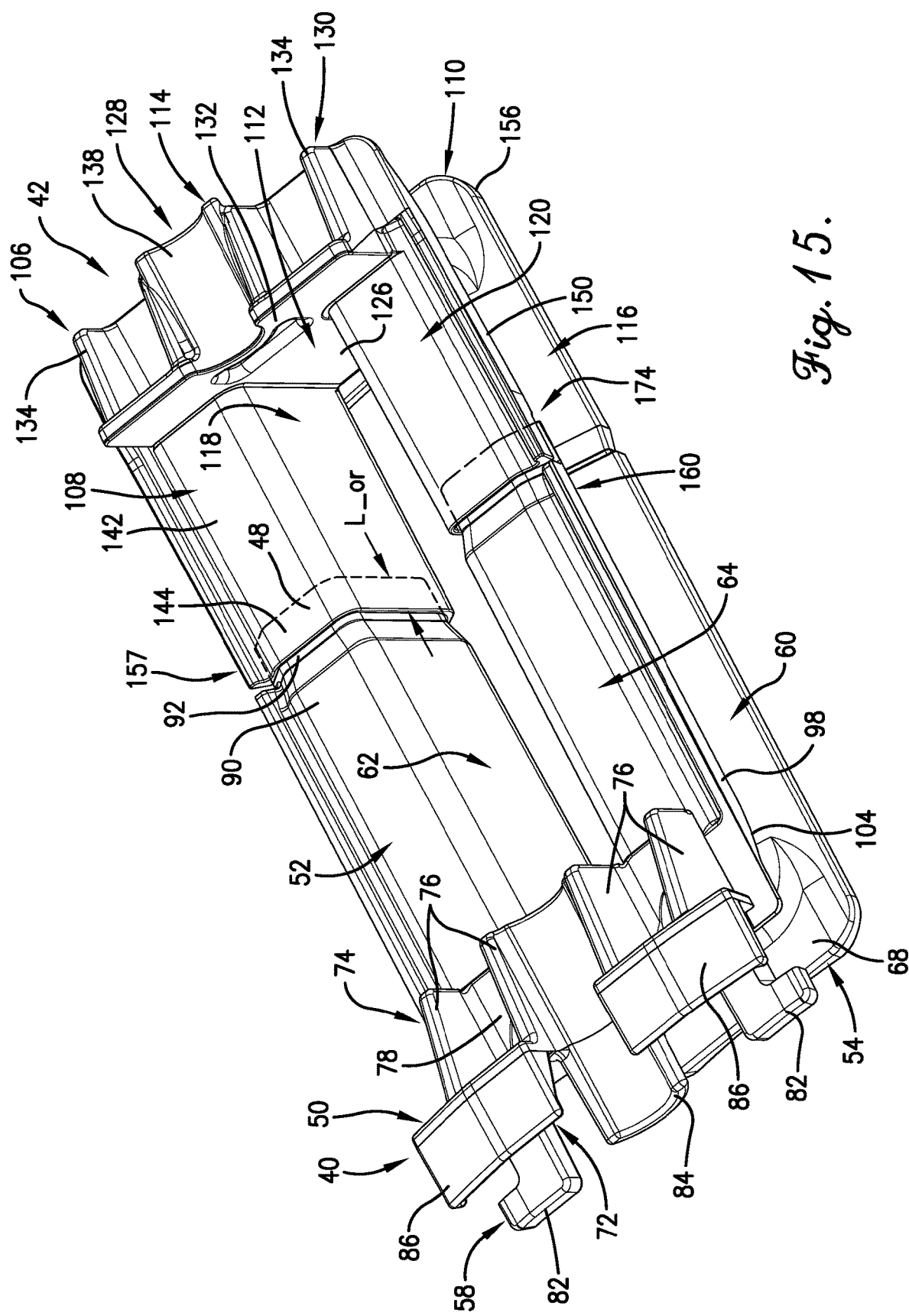
FIG. 15 is an alternative perspective view of the engaged pair of upper and lower end caps of FIG. 14.

The upper and lower overlappable portions 92 and 144 preferably each present respective axial extents or lengths L_uop and L_lop, respectively (see FIG. 17). The upper and lower skirt lengths L_us and L_ls and the upper and lower overlappable portion lengths L_uop and L_lop are designed to accommodate the aforementioned allowable variations in actual axial stack height H_sc-a. For a stator core 12 having an actual axial stack height H_sc-a equal to the maximum allowable stack height, for instance, an axial dimension L_or (see FIGS. 15, 17, and 20) of the overlapping region 48 will be minimized as the end caps 40 and 42 shift axially away from each other. In contrast, for a stator core 12 having an actual axial stack height H_sc-a equal to the minimum allowable stack height, the axial dimension L_or of the overlapping region 48 will be maximized as the end caps 40 and 42 move axially toward each other.

In this manner, axially continuous insulation of the teeth 16 is achieved in a simple and robust manner for all stator cores 12 falling within allowable manufacturing tolerances, without any changes being made to the provided end caps 40 and 42 and without the provision of additional insulative means. Such a design is highly advantageous. For instance, conventional upper and lower end caps remain axially spaced from one another even after assembly, such that an axially extending exposed portion of the corresponding tooth remains. To rectify this exposure, liners are conventionally first inserted between each pair of teeth so as to line the tooth sides. The end caps are then placed on the teeth and, in theory, smoothly over the top of the liners. In practice, the additional step of placing the liners is cumbersome and inefficient. Furthermore, deformation (for instance, smashing, crinkling, and so on) of the liners frequently occurs as the tightly fitted, generally rigid end caps are forcefully placed on the corresponding teeth. Thus, omission of such liners (as in the present design, in which liners are entirely unnecessary and would be both redundant and obstructive) results in significant time and cost savings, as well as improved and more reliable motor insulation.

End Cap Interchangeability

In addition to accommodating axial stack height tolerances and eliminating the need for liners or other insulative means, the end caps 40 and 42 of the present invention are also easily interchangeable with other end caps of their type (i.e, upper or lead end, vs. lower or opposite lead end) having differing axial skirt lengths but maintaining identical tops 50 and bottoms 106, respectively.

For instance, consider a set of six (6) stator cores designated herein as Stator Cores A, B, C, D, E, and F, each having a different nominal and actual axial stack height.

Figure 21:
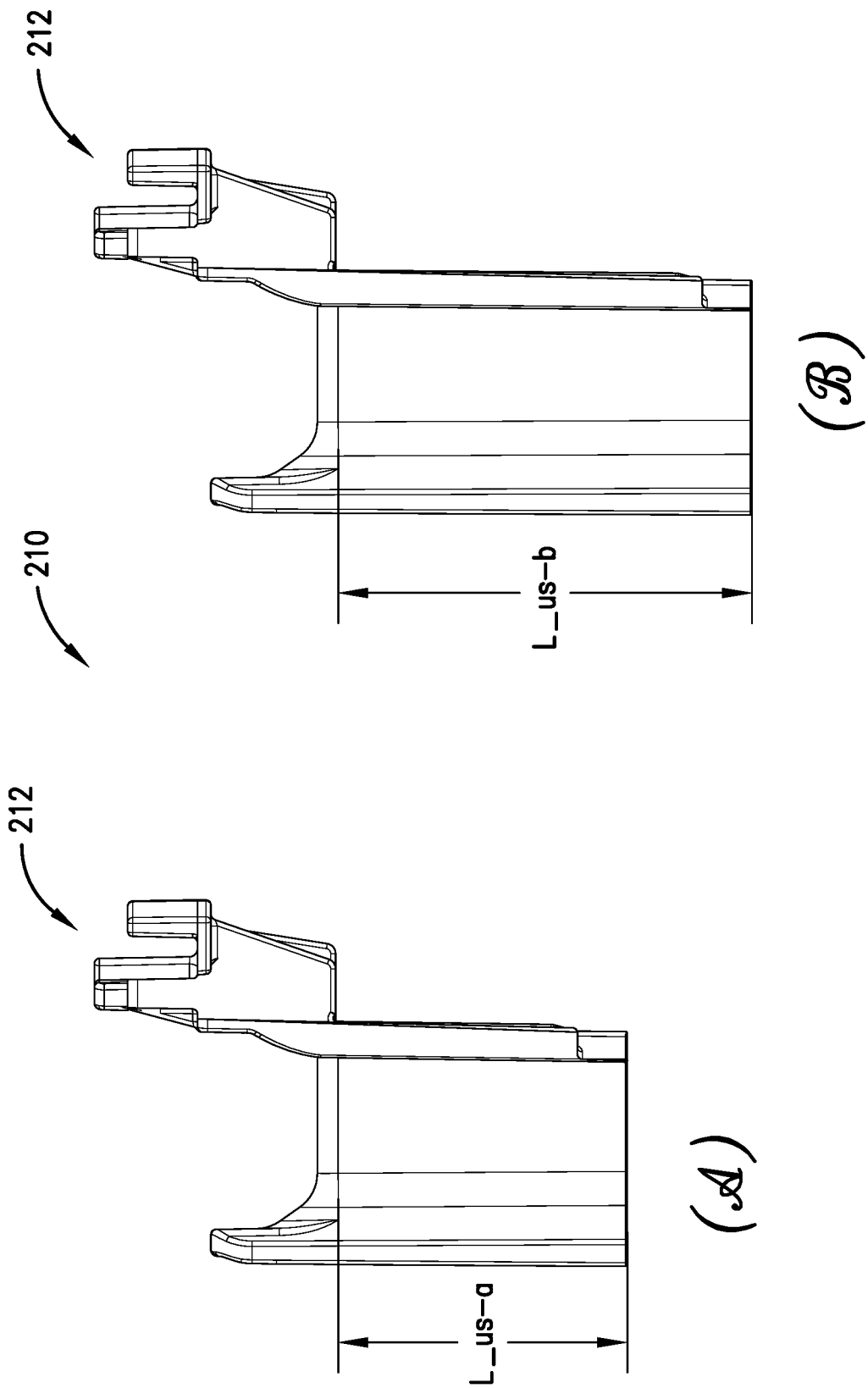
FIG. 21 is a side view of the upper end caps of a set of interchangeably pairable end caps.
Figure 22:
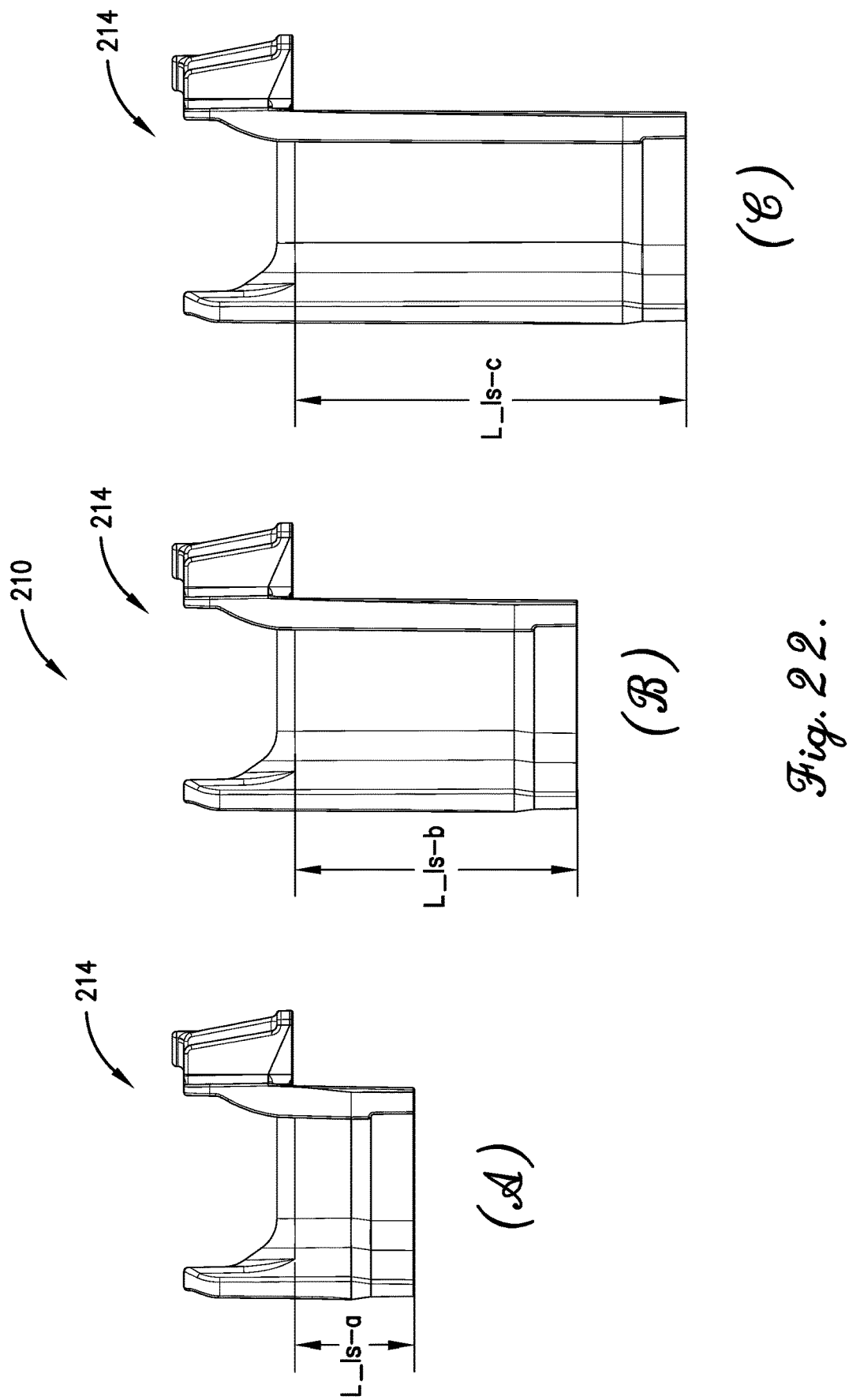
FIG. 22 is a side view of the lower end caps of the set of interchangeably pairable end caps.

Additionally, with reference to FIGS. 21 and 22, consider a set 210 of interchangeably configurable end caps including both upper end caps 212 and lower end caps 214. More particularly, as shown in FIG. 21, the set 210 includes two (2) upper end caps 212, designated herein as Upper End Caps A and B, and having different upper skirt lengths L_us-a and L_us-b, respectively. Furthermore, as shown in FIG. 22, the set 210 includes three (3) lower end caps 214, designated herein as Lower End Caps A, B, and C, and having different lower skirt lengths L_ls-a, L_ls-b, and L_ls-c, respectively.

Pairing of Upper End Cap A with Lower End Cap A would result in a first cumulative axial extent that is different than that which would result from pairing of upper End Cap A with Lower End Cap B or Lower End Cap C. Pairing of Upper End Cap B with each of the Lower End Caps A-C would result in three (3) axial extents that are also distinct from one another and also distinct from the three (3) axial extents associated with Upper End Cap A.

Thus, in this example, a set of five (5) total end caps are interchangeably configurable (more specifically, pairable) to define six (6) distinct cumulative axial extents. Careful selection of the individual skirt lengths to ensure that these six (6) distinct cumulative axial extents corresponds to the six (6) distinct nominal axial stack heights of the Stator Cores A-F leads to the ability to efficiently and effectively insulate a given tooth of all six (6) Stator Cores A-F using a single set of five (5) end caps comprising two (2) Upper End Caps and three (3) Lower End Caps.

As will be readily apparent to those of ordinary skill in the art, absent the interchangeable pairability of the present invention, a set of twelve (12) end caps comprising six (6) upper end caps and six (6) lower end caps would instead be necessary.

Of course, provided appropriate skirt length selections, any number of combinations of upper and lower end caps may be interchangeably made to facilitate any number of axial stack heights. Furthermore, it is permissible according to some aspects of the present invention for more than one combination to produce a given cumulative axial extent.

Rounded Wire Barrier

As noted previously, each upper end cap 40 preferably presents a pair of upper wire barrier portions 98. Likewise, each lower end cap 42 preferably presents a pair of lower wire barrier portions 150. When a corresponding pair of upper and lower end caps 40 and 42 are in a paired configured, as when placed over a corresponding tooth 16, each upper wire barrier portion 98 aligns with a corresponding one of the lower wire barrier portions 150 such that they cooperatively form a generally radially projecting, axially extending wire barrier 160.

Figure 14:
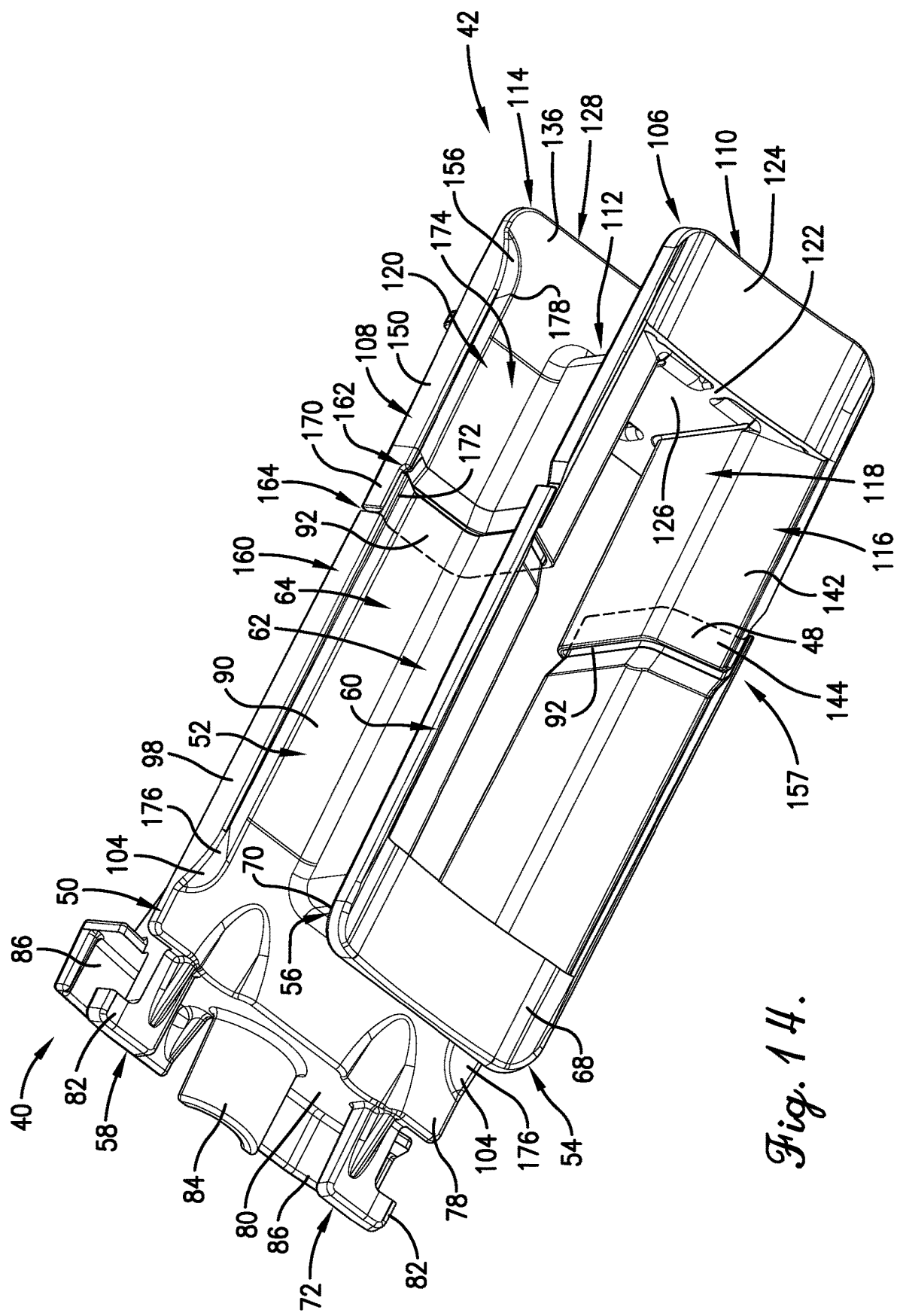
FIG. 14 is an enlarged perspective view of an engaged pair of upper and lower end caps.
Figure 16:
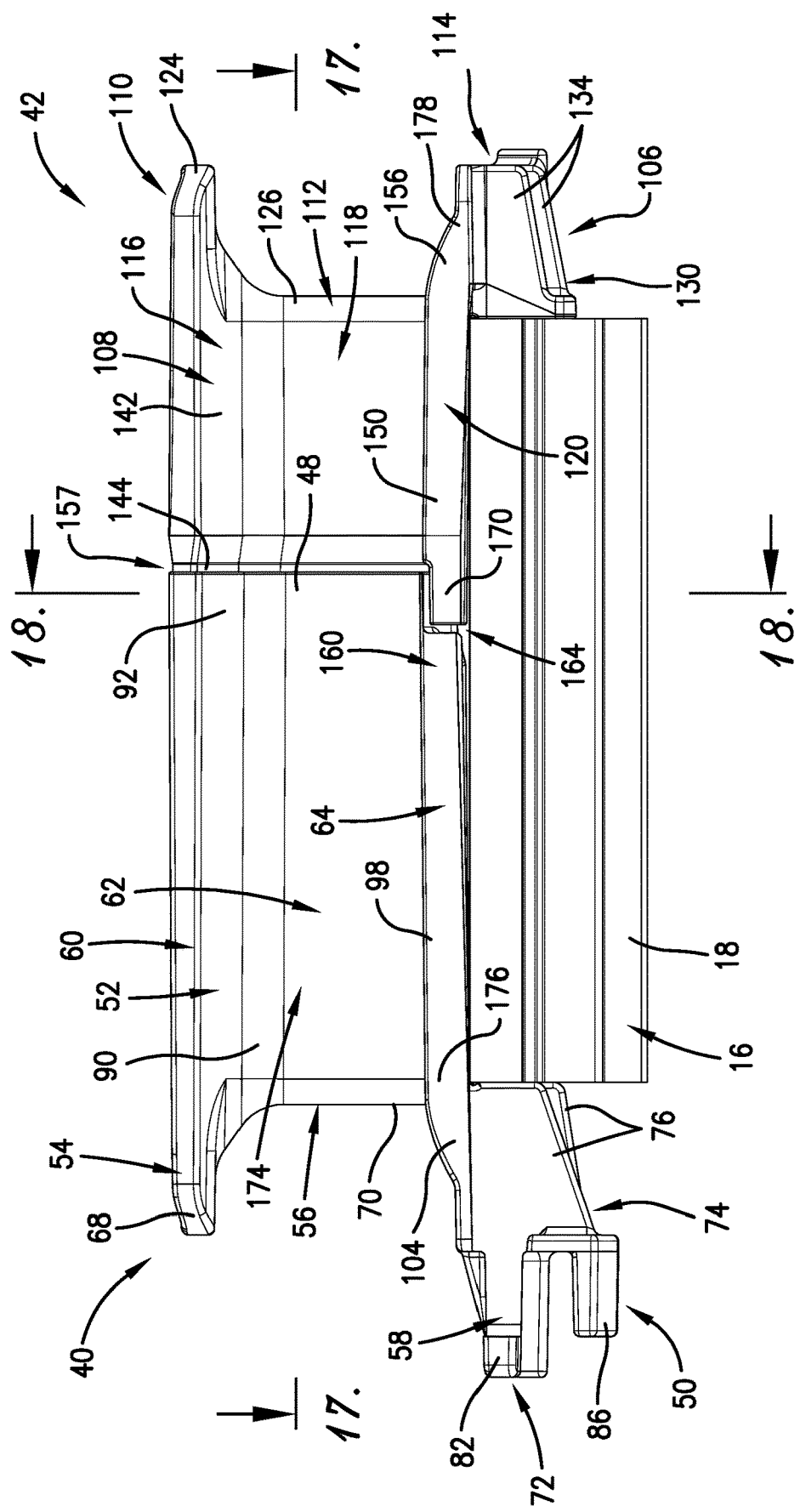
FIG. 16 is a side view of a single tooth and the engaged pair of upper and lower end caps of FIGS. 14 and 15.

The wire barrier 160 is preferably substantially continuous between the ends 104 and 156, although a small inner discontinuity 162 (see FIG. 14) and a small outer discontinuity 164 (see FIGS. 14 and 16) may be present at or near the juncture 157. More particularly, an upper notch 166 is preferably formed in a tangentially outer portion of the upper wire barrier portion 98. A lower notch 168 is preferably formed in a tangentially inner portion of the lower wire barrier portion 150. A lower barrier projection 170 is received in the upper notch 166, and an upper barrier projection 172 is received in the lower notch 168. Portions of the upper notch 166 not filled by the lower barrier projection 170 constitute the outer discontinuity 164, and portions of the lower notch 168 not filled by the upper barrier projection 172 constitute the inner discontinuity 162.

Such discontinuities 162 and 164 will increase in size for actual axial stack heights that are nearer a maximum axial stack height, or, alternatively stated, as the size of the overlapped region 48 decreases. However, an axial dimension of any inner discontinuity 162 is preferably less than twenty five percent (25%) of the cumulative axial extent L_ec of the end caps 40 and 42, more preferably less than ten percent (10%) of the cumulative axial extent L_ec, and most preferably less than about five percent (5%) of the cumulative axial extent L_ec. Likewise, an axial dimension of any outer discontinuity 164 is preferably less than twenty five percent (25%) of the cumulative axial extent L_ec of the end caps 40 and 42, more preferably less than ten percent (10%) of the cumulative axial extent L_ec, and most preferably less than about five percent (5%) of the cumulative axial extent L_ec.

For present purposes, a wire barrier 160 associated with an inner discontinuity 162 having an axial extent that is less than ten (10%) of the cumulative axial extent of the cumulative axial extent L_ec shall be understood to be substantially axially continuous. Such an inner discontinuity 162 will be understood by those in the art to be small enough to not have detrimental effects of the wiring 46 during winding, nor on the coils 14 after winding.

Preferably, the aforementioned upper and lower wire trough portions 102 and 154 cooperatively define an axially extending trough 174 through which wiring 46 is wound and in which a part of the corresponding coil 14 is disposed. Each slot 44 thus preferably includes a pair of troughs 174, with each of the troughs 174 in a given slot 44 being associated with a different tooth 16.

Each wire barrier 160 defines a tangential or circumferential outer margin of the corresponding trough 174. The corresponding upper and lower skirt arm portions 62 and 118 are each spaced generally tangentially inwardly from respective ones of the wire barriers 160 to define a tangential or circumferential inner margin of each trough 174. The corresponding upper and lower skirt yoke portions 64 and 120, along with portions of each of the upper and lower wire retaining walls 78 and 136, cooperatively define a radially outer margin of each trough 174. The corresponding upper and lower skirt crown portions 60 and 116, along with portions of each of the retaining walls 68 and 124 of the top and bottom crown portions 54 and 110, cooperatively define a radially inner margin of each trough 174.

As briefly noted above, the upper and lower wire barrier portions 98 and 150 present respective upper and lower ends 104 and 156. As also noted above, the ends 104 and 156 are each preferably strategically rounded, smoothed, or chamfered in some manner, as opposed to presenting a squared, jagged, or otherwise rough or abruptly edged form. That is, in a broad sense, the ends 104 and 156 are shaped so as to facilitate unobstructed and simplified winding while also guiding wiring 46 into the aforementioned wiring trough 174. Each of the ends 104 and 156 therefore forms a respective winding ramp 176 or 178 configured to smoothly guide wiring 46 into the trough 174 during wiring of the core 12.

Figure 8:
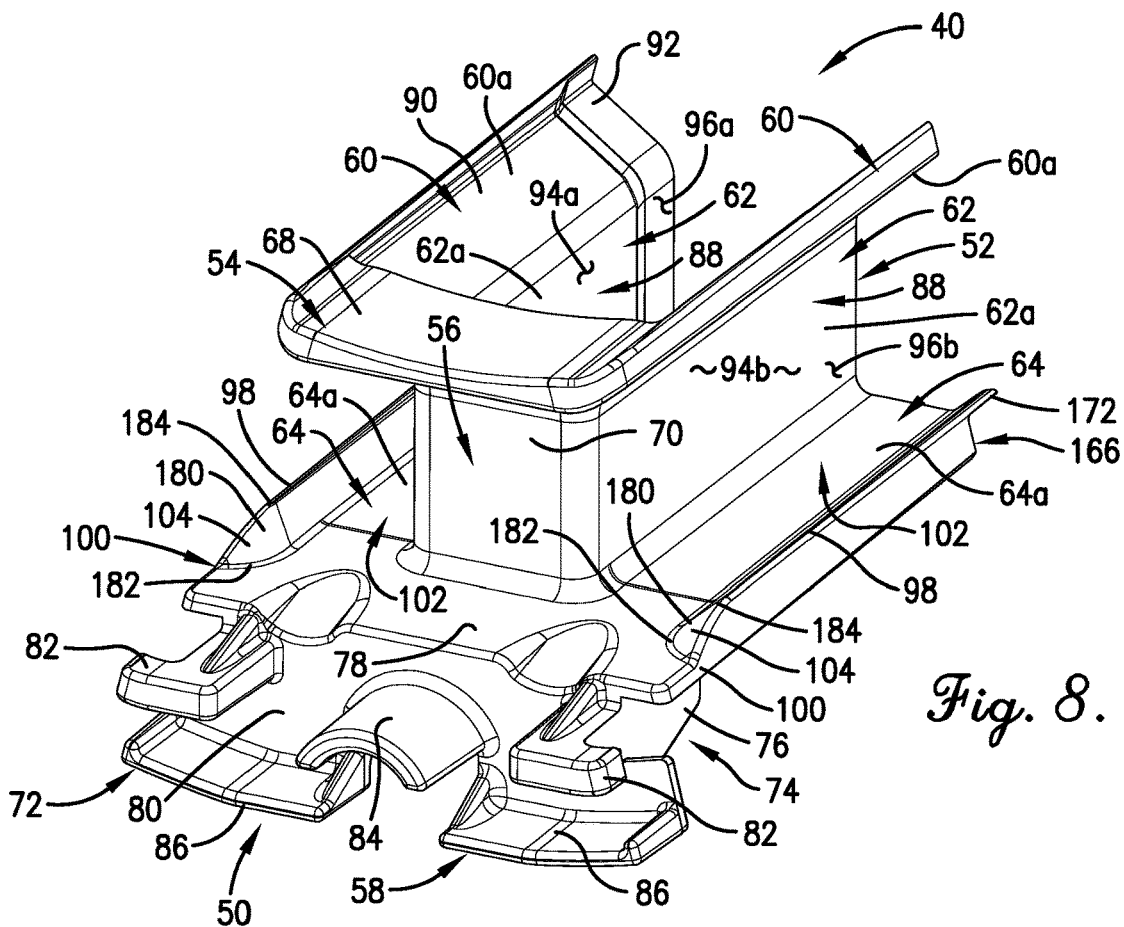
FIG. 8 is another perspective view of the upper end cap of FIGS. 6 and 7.
Figure 9:
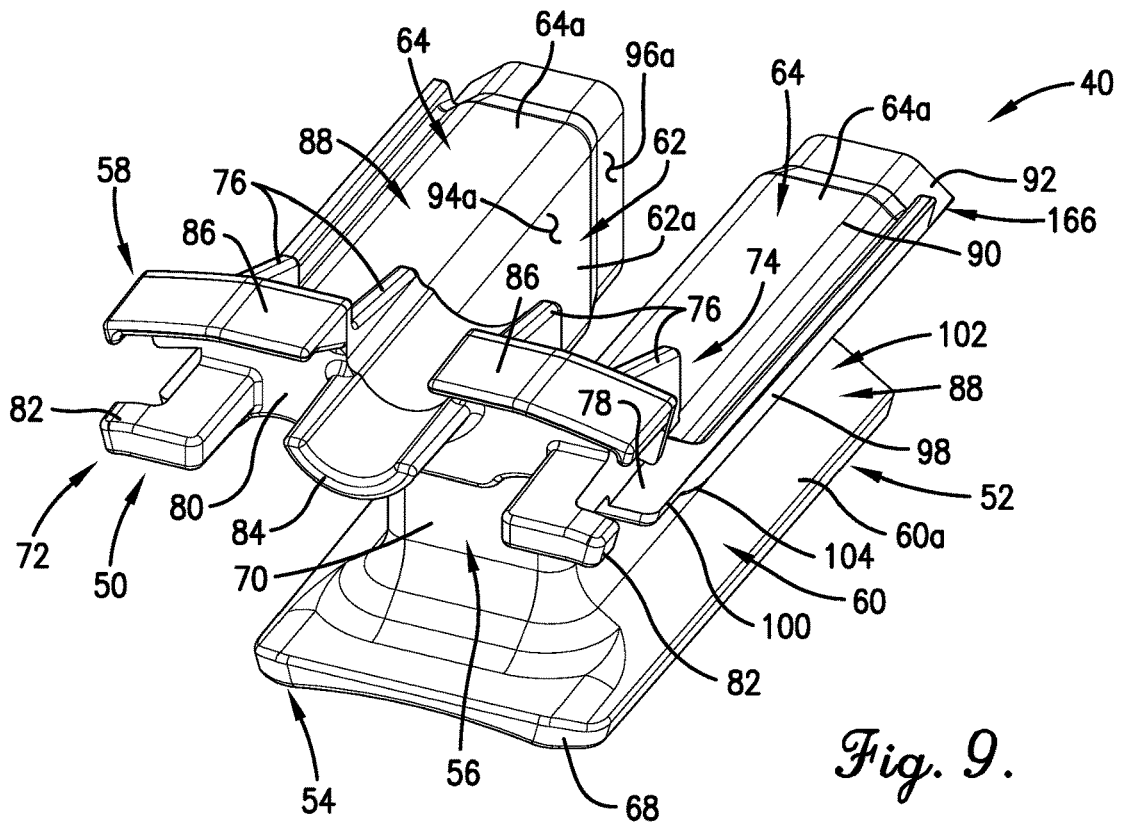
FIG. 9 is yet another perspective view of the upper end cap of FIGS. 6-8.
Figure 10:
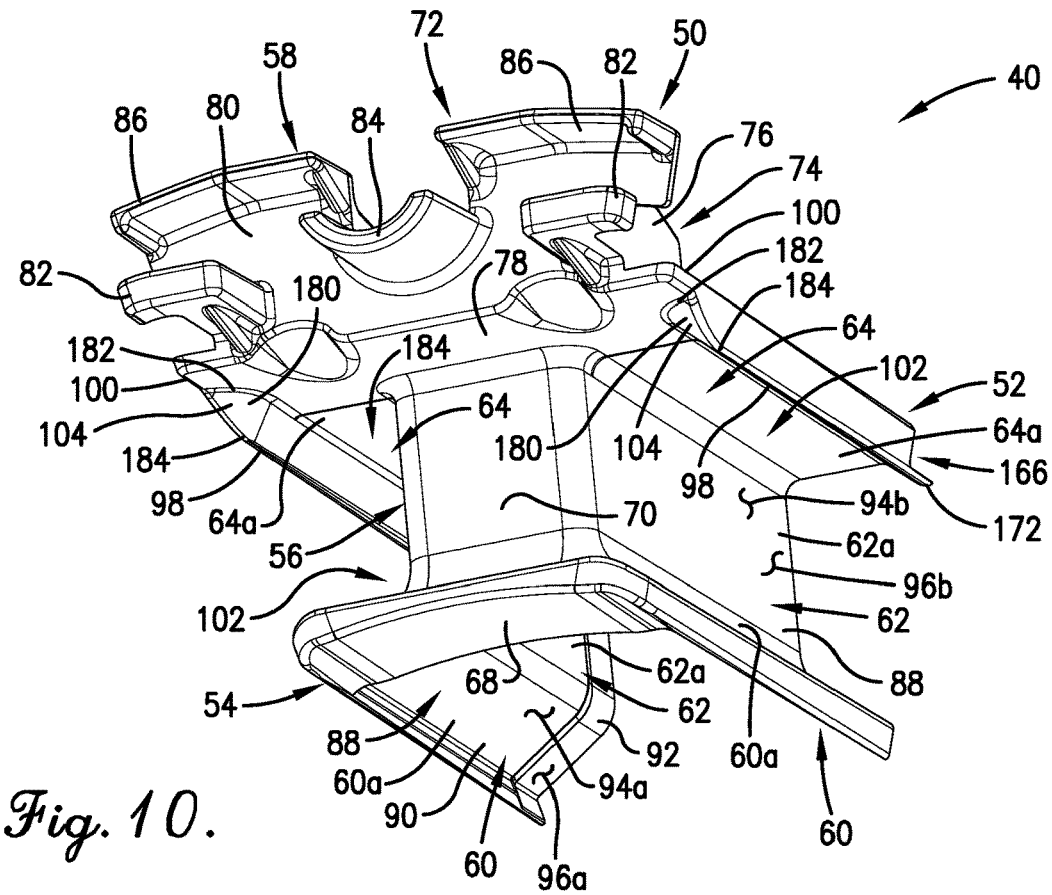
FIG. 10 is still another perspective view of the upper end cap of FIGS. 6-9.
Figure 11:
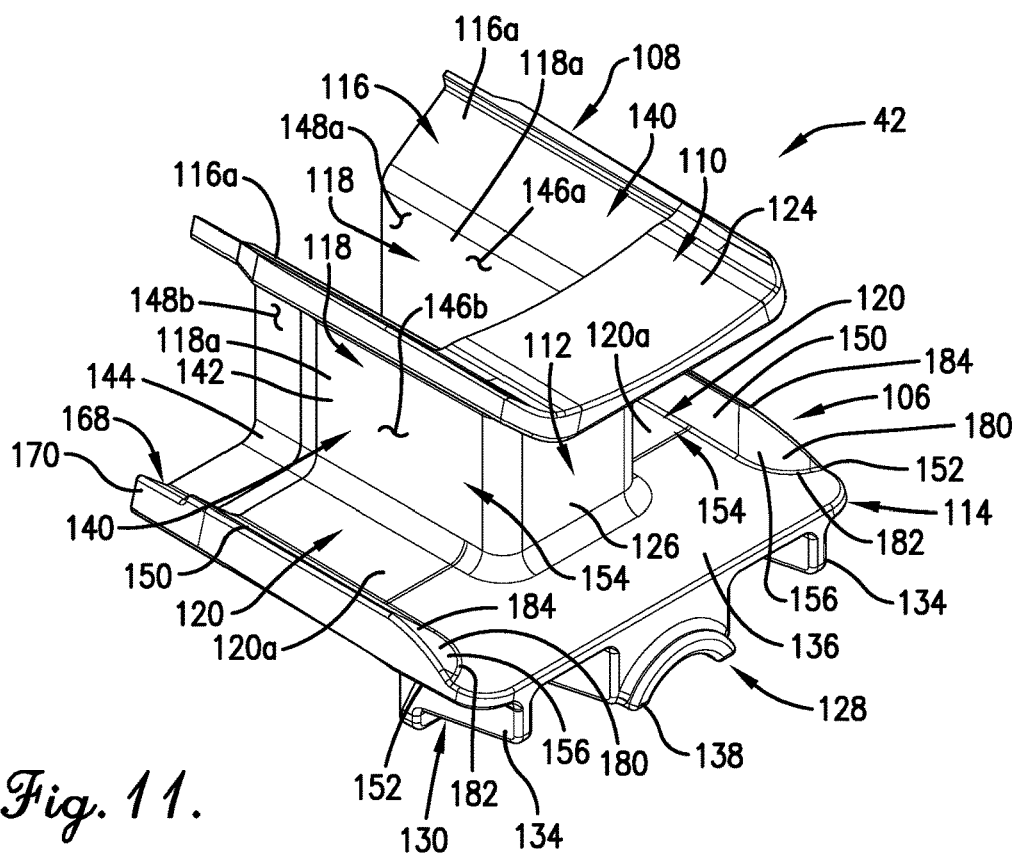
FIG. 11 is an enlarged perspective view of a lower end cap.
Figure 12:
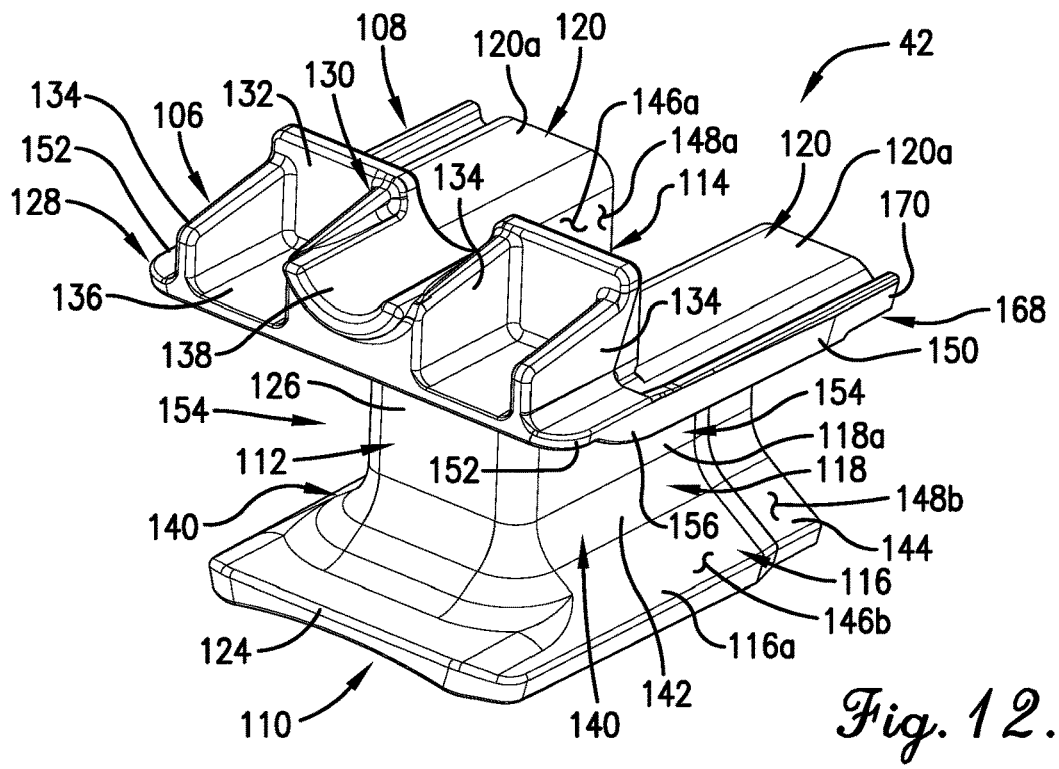
FIG. 12 is an alternative perspective view of the lower end cap of FIG. 11.
Figure 13:
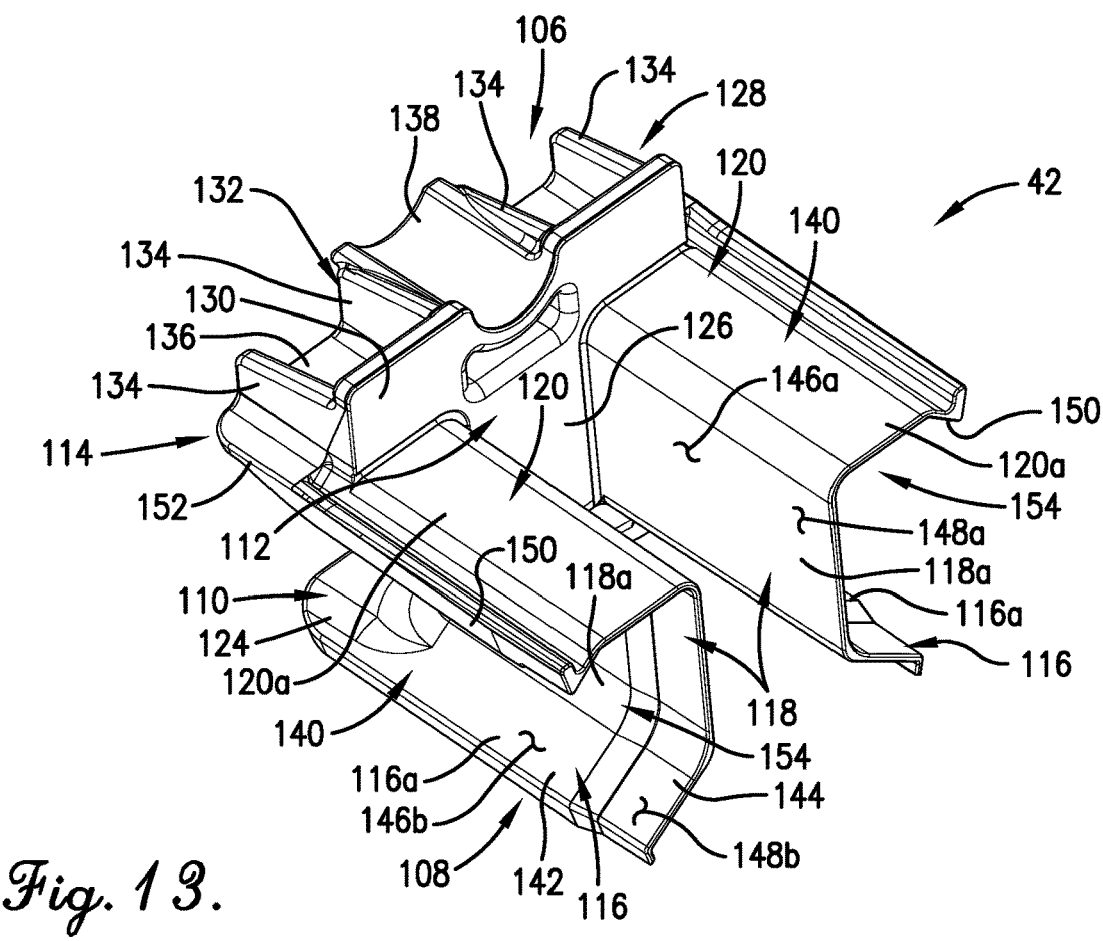
FIG. 13 is another alternative perspective view of the lower end cap of FIGS. 11 and 12.

In the illustrated embodiment, for instance (and as shown in FIGS. 8, 10, 11, and others), each end 104 and 156 is in the form of a quartered cone 180 having a radiused base 182 and smoothed top 184. This in contrast to a conventional squared end, which may lead to snagging, catching, and/or misdirection of the wire during winding.

Each wire barrier 160 preferably extends axially upwardly beyond the corresponding upper arm overlayment 70 and axially downwardly beyond the corresponding arm underlayment 126.

More particularly, each upper wire barrier portion 98 extends axially upwardly along the upper retaining wall 78, past the upper arm overlayment 70. Preferably, the upper wire barrier portion 98 extends along only a portion of the axial extent of the upper retaining wall 78 beyond the upper arm overlayment 70. Most preferably, the upper wire barrier portion 98 extends axially along about half of the axial extent of the upper retaining wall 78 beyond the upper arm overlayment 70.

Similarly, each lower wire barrier portion 150 extends axially downwardly along the lower retaining wall 136, past the lower arm underlayment 126. Preferably, the lower wire barrier portion 150 extends along only a portion of the axial extent of the lower retaining wall 136 beyond the lower arm underlayment 126. Most preferably, the lower wire barrier portion 98 extends axially along about half of the axial extent of the lower retaining wall 136 beyond the lower arm underlayment 126.

Even more particularly, each rounded upper end 104 (or, alternatively, upper ramp 176) preferably extends axially upwardly along the upper retaining wall 78, past the upper arm overlayment 70. Preferably, the end 104 (or, alternatively, the ramp 176) extends along only a portion of the axial extent of the upper retaining wall 78 beyond the upper arm overlayment 70. Most preferably, the end 104 (or, alternatively, the ramp 176) extends axially along about half of the axial extent of the upper retaining wall 78 beyond the upper arm overlayment 70.

Similarly, each rounded lower end 156 (or, alternatively, lower ramp 178) extends axially downwardly along the lower retaining wall 136, past the lower arm underlayment 126. Preferably, the lower end 156 (or, alternatively, the lower ramp 178) extends along only a portion of the axial extent of the lower retaining wall 136 beyond the lower arm underlayment 126. Most preferably, the lower end 156 (or, alternatively, the lower ramp 178) extends axially along about half of the axial extent of the lower retaining wall 136 beyond the lower arm underlayment 126.

The preferred axial extents as described in detail above, in combination with the rounded features also described above, facilitate smooth, even winding of the coils 14 with minimal snagging and other errors, inconsistencies, and imperfections associated with conventional end cap designs.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. A stator comprising:
a generally toroidal core presenting axially opposed first and second core faces;
a first end cap fitted to the core;
a second end cap fitted to the core; and
wiring wound about the core,
said end caps extending toward each other and between the upper and lower core faces to at least in part encompass the core,
said end caps being at least in part disposed between the wiring and the core,
said end caps cooperatively defining an axially extending trough receiving at least a portion of said wiring,
said end caps cooperatively defining a generally radially projecting, generally axially extending wire barrier defining a generally circumferential margin of the trough,
said wire barrier including axially opposed ends, wherein the first end cap defines a first one of the ends and the second end cap defines a second one of the ends,
each of said ends forming a respective rounded winding ramp configured to smoothly guide wiring into the trough during wiring of the core.

2. The stator as claimed in claim 1,
said wire barrier extending at least substantially continuously axially between the ends.

3. The stator as claimed in claim 1,
said first end cap including a first wire barrier portion defining a notch,
said second end cap including a second wire barrier portion defining a projection,
said projection being received in said notch.

4. The stator as claimed in claim 1,
said core including a yoke and a tooth extending generally radially from the yoke,
said tooth including a generally radially extending arm,
said arm including a pair of generally tangentially spaced apart, generally axially extending arm side faces,
each of said end caps including an arm side portion extending along one of said arm side faces,
said arm side portions being spaced generally tangentially from said wire barrier to define a second generally circumferential margin of the trough.

5. The stator as claimed in claim 4,
each of said end caps including a yoke portion extending generally tangentially along the yoke,
said wire barrier projecting generally radially from said yoke portion.

6. The stator as claimed in claim 5,
a part of each of said yoke portions extending between and interconnecting the wire barrier and respective ones of the arm side portions,
each said part of each of said yoke portions at least in part defining a generally radial margin of the trough.

7. The stator as claimed in claim 1,
each of said end caps including a yoke portion extending generally tangentially along the yoke,
said wire barrier projecting generally radially from said yoke portion.

8. The stator as claimed in claim 1,
said first end cap including a first interengaging structure,
said second end cap including a second interengaging structure,
said first and second interengaging structures engaging one another at a juncture, such that said first and second end caps cooperatively continuously encompass at least part of the core.

9. The stator as claimed in claim 1,
said end caps cooperatively defining an axially extending second trough receiving at least another portion of said wiring, said end caps cooperatively defining a generally radially projecting, generally axially extending second wire barrier defining a generally circumferential margin of the second wiring trough, said second wire barrier including axially opposed second ends, wherein the first end cap defines a first one of the second ends and the second end cap defines a second one of the second ends, each of said second ends forming a respective rounded second winding ramp configured to smoothly guide wiring into the second trough during wiring of the core.

\* \* \* \* \*